United States Patent
Arai et al.

(10) Patent No.: US 6,247,090 B1
(45) Date of Patent: Jun. 12, 2001

(54) DISPLAY APPARATUS ENABLED TO CONTROL COMMUNICATABILITY WITH AN EXTERNAL COMPUTER USING IDENTIFICATION INFORMATION

(75) Inventors: Ikuya Arai; Kouji Kitou, both of Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/265,363

(22) Filed: Mar. 10, 1999

Related U.S. Application Data

(63) Continuation of application No. 08/833,346, filed on Apr. 4, 1997, now Pat. No. 5,887,147, which is a continuation of application No. 08/598,903, filed on Feb. 9, 1996, now Pat. No. 5,652,845, which is a continuation of application No. 08/190,848, filed on Feb. 3, 1994, now abandoned.

(30) Foreign Application Priority Data

Feb. 10, 1993 (JP) ................................. 5-022212

(51) Int. Cl.[7] ................................................ G06F 13/38
(52) U.S. Cl. ...................... 710/129; 710/62; 710/64; 345/99; 345/132
(58) Field of Search .................................. 710/101–103, 710/129, 62, 63, 64, 65, 72, 8–11, 14, 15–17, 2; 395/186, 187.01, 188.01; 345/58, 98–100, 132, 204; 709/236, 237, 249, 250

(56) References Cited

U.S. PATENT DOCUMENTS

| 4,047,158 | 9/1977 | Jennings . |
| 4,169,262 | 9/1979 | Schwartz et al. ................ 340/744 |
| 4,177,462 | 12/1979 | Chung .............................. 340/703 |

(List continued on next page.)

FOREIGN PATENT DOCUMENTS

| 37 22 169 A1 | 1/1989 | (DE) . |
| 43 36 116 A1 | 5/1994 | (DE) . |
| 0 456 923 A1 | 11/1991 | (EP) . |
| 0612053A1 | 8/1994 | (EP) . |
| 61-84688 | 4/1986 | (JP) . |
| 1-321475 | 12/1989 | (JP) . |
| 2-250576 | 10/1990 | (JP) . |
| 3-56931 | 3/1991 | (JP) . |
| 3-116093 | 5/1991 | (JP) . |
| 3-261995 | 11/1991 | (JP) . |
| 5-46106 | 2/1993 | (JP) . |
| 5-232918 | 9/1993 | (JP) . |

OTHER PUBLICATIONS

"Display Function Identification", IBM Technical Disclosure Bullentin, vol. 25, No. 12, pp. 5568–5579, May 1980.
"Monitor Identification Technique", IBM Technical Disclosure Bullentin, vol. 30, No. 2, pp. 839–840, Jul. 1990.
"Display Controller Set up as a Function of Display Monitor type, Display Jumper Settings and Amount of Vram", IBM Technical Disclosure Bullentin, vol. 30, No. 2, pp. 352–353, Jul. 1990.
"Improved Method of Monitor Identification and Mode Control", IBM Technical Disclosure Bullentin, vol. 33, No. 5, pp. 289–291, Oct. 1990.

(List continued on next page.)

*Primary Examiner*—Robert Beausoleil
*Assistant Examiner*—Raymond N Phan
(74) *Attorney, Agent, or Firm*—Antonelli, Terry, Stout & Kraus, LLP

(57) ABSTRACT

In the computer, the control information for screen display incorporated in the keyboard and software is processed by CPU2 and sent to the display device via the communication controller. The microcomputer in the display device fetches the control information from the communication controller and controls a predetermined part of the video circuit or deflection circuit. In this case, identification information is sent to the display device from the computer first and when it matches with the identification information stored in the memory, the above control is permitted.

4 Claims, 12 Drawing Sheets

U.S. PATENT DOCUMENTS

| | | | |
|---|---|---|---|
| 4,197,590 | 4/1980 | Sukonick et al. | 364/900 |
| 4,342,029 | 7/1982 | Hofmanis et al. | 340/703 |
| 4,450,535 * | 5/1984 | De Pommery et al. | 395/186 |
| 4,747,041 | 5/1988 | Engel et al. . | |
| 4,800,376 | 1/1989 | Suga et al. . | |
| 4,882,687 | 11/1989 | Gordon | 364/518 |
| 4,893,248 * | 1/1990 | Pitts et al. | 364/464.01 |
| 4,922,448 | 5/1990 | Kunieda et al. . | |
| 4,991,023 * | 2/1991 | Nicols | 358/242 |
| 5,010,238 | 4/1991 | Kadono et al. . | |
| 5,276,458 * | 1/1994 | Sawdon | 345/132 |
| 5,276,875 | 1/1994 | Satoh . | |
| 5,282,247 * | 1/1994 | McLean et al. | 380/4 |
| 5,309,504 * | 5/1994 | Morganstein | 379/67 |
| 5,317,691 | 5/1994 | Traeger . | |
| 5,353,423 | 10/1994 | Hamid et al. . | |
| 5,375,210 * | 12/1994 | Monnes et al. | 710/1 |
| 5,457,473 * | 10/1995 | Arai et al. | 345/10 |
| 5,483,255 * | 1/1996 | Numao | 345/98 |
| 5,550,966 * | 8/1996 | Drake et al. | 395/154 |
| 5,599,231 * | 2/1997 | Hibino et al. | 463/29 |
| 5,887,147 * | 3/1999 | Arai et al. | 710/106 |
| 5,896,546 * | 4/1999 | Monahan et al. | 710/10 |
| 5,909,592 * | 6/1999 | Shipman | 710/10 |
| 5,948,091 * | 9/1999 | Kerigan et al. | 710/129 |
| 6,012,103 * | 1/2000 | Sartore et al. | 710/8 |

OTHER PUBLICATIONS

"Improvements to Display Identification", IBM Technical Disclosure Bullentin, vol. 33, No. 6B, pp. 83–85.

"Self–Identification Protocol Intitialization", IBM Technical Disclosure Bullentin, vol. 33, No. 10 A, pp. 406–407, Mar. 1991.

* cited by examiner

FIG. 2

| ADDRESS 1 | NUMBER OF DATA SET | REGISTERED ID NUMBERS |
|---|---|---|
| ADDRESS 2 | | DATA AREA 1 FOR DELIVERY ADJUSTMENT |
| ADDRESS 3 | | DATA AREA 2 FOR DELIVERY ADJUSTMENT |
| ⋮ | | ⋮ |
| ADDRESS i | | ADJUSTMENT DATA AREA 1 FOR USER |
| ADDRESS i+1 | | ADJUSTMENT DATA AREA 2 FOR USER |
| ⋮ | | ⋮ |

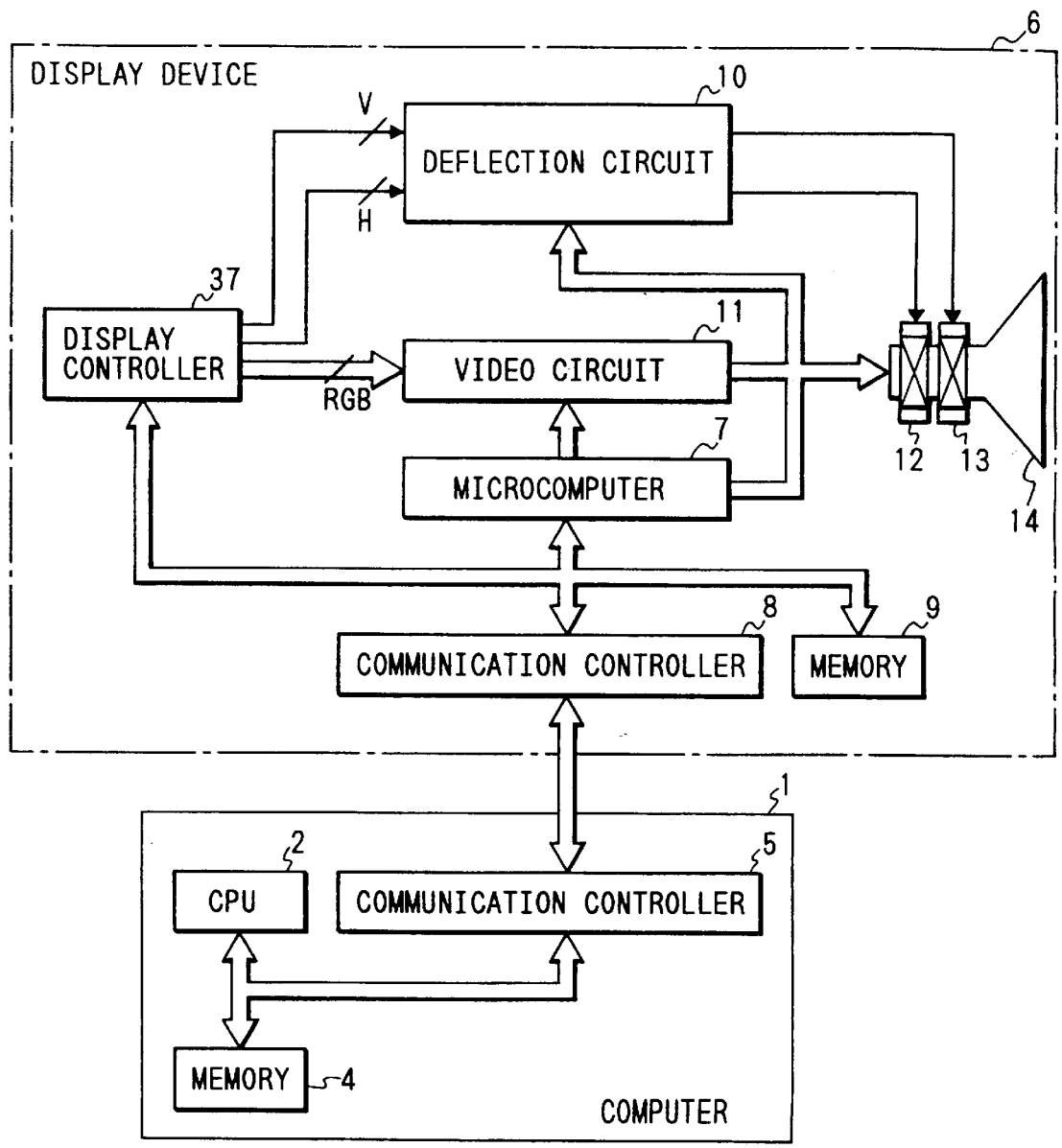

DISPLAY APPARATUS ENABLED TO CONTROL COMMUNICATABILITY WITH AN EXTERNAL COMPUTER USING IDENTIFICATION INFORMATION

CROSS REFERENCE TO RELATED APPLICATION

This is a continuation of U.S. application Serial No. 08/833,346, filed Apr. 4, 1997, now U.S. Pat. No. 5,887,147, issued Mar. 23, 1999, which is a continuation of U.S. application Ser. No. 08/598,903, filed Feb. 9, 1996, now U.S. Pat. No. 5,652,845, issued Jul. 29, 1997, which is a continuation of U.S. application Ser. No. 08/190,848, filed Feb. 3, 1994, now abandoned, the subject matter of which is incorporated by reference herein.

BACKGROUND OF THE INVENTION

The present invention relates to an information output system or display apparatus including a computer and an information output device such as a display device or a printer as a computer terminal and more particularly to an information output system or display apparatus for performing various types of control such as the information output method and allowing or not allowing of information output from the computer connected to the above information output device via a communication interface.

In current display devices as computer terminals, a wide variety of display positions and sizes on the screen and video signal frequencies to be displayed are used depending on video signals to be inputted. Therefore, a display or a so-called multi-scan display has been used so that a display device can handle various video signals.

A microcomputer or a memory LSI is used to provide a most suitable display image for each video signal as this type of display device. Such a prior art is indicated in Japanese Patent Application Laid-Open No. 1-321475.

According to this prior art, the microcomputer controls the memory which stores information of the display position and size on the screen for each video signal beforehand and reads the information of the most suitable display position and size on the screen depending on the input video signal from the memory. The microcomputer outputs a control signal on the basis of the read information. This control signal is applied to the deflection circuit as a control voltage or control current through a D-A converter so as to control the voltage or current at a predetermined part of the deflection circuit. By doing this, the display size and position of the display device can be adjusted. When a video signal inputted to the display device is not a known signal, no corresponding information is kept in the above memory. Therefore, the switch mounted on the front of the display device is operated so as to input the adjustment information of the display position and size on the screen. The control circuit of the above microcomputer creates deflection control information on the basis of the above input information and adjusts the display position and size.

According to the aforementioned prior art, the display device obtains a most suitable screen display according to the input video signal. However, according to another prior art, the computer controls and changes the display status. Such a prior art is indicated in Japanese Patent Application Laid-Open No. 61-84688. According to this prior art, a discrimination pulse is superimposed at the blanking interval of a video signal outputted from the computer and the deflection frequency of the display device is changed on the basis of this discrimination pulse.

According to the former prior art among the aforementioned prior arts, the control of the display position and size on the screen is managed by the display device. Therefore, when adjustment is required or requested from the user of display device, it is necessary to perform manual adjustment using the adjustment switch of the display device each time and it is rather troublesome to operate the system.

According to the latter prior art among the aforementioned prior arts, the control can be operated by the computer. However, since the operation is such that the deflection frequency is simply changed on the basis of the discrimination pulse superimposed on the video signal, an image cannot be adjusted to the display image (display position and size) which is required by a user of the computer. Namely, there is a problem imposed that the status which is simply desired by the user cannot be obtained. Furthermore, no consideration is given to prevention of display (indication) of careless images (information) and restraining of unnecessary power consumption. Even if the discrimination pulse is superimposed at the blanking interval of the video signal, the video blanking level is generally shallow in the case of the display device, so that the discrimination pulse is displayed. Furthermore, the control is applied only in one direction from the computer to the display device and no information is sent in the reverse direction, so that there is another problem imposed that a malfunction cannot be avoided.

SUMMARY OF THE INVENTION

An object of the present invention is to provide an information output system wherein a computer can exercise various types of control of an information output device such as a display device. Another object of the present invention is to provide an information output system for maintaining secrecy of information and for restraining power consumption. A further object of the present invention is to provide an information output system for informing the computer of the operation status of the information output device so as to allow easy maintenance.

To accomplish the above objects, according to the present invention, in an information output system consisting of at least a computer and an information output device, the computer is equipped with a first communication means and the information output device is equipped with a second communication means. Furthermore, a control processing means and a memory means for storing the identification number of the computer beforehand are added to the information output device, or a memory means for storing the identification number of the information output device beforehand is mounted in the computer in addition to the first communication means. The above second communication means has a plurality of communication interfaces. Furthermore, a detection means for detecting the internal operation status and a control processing means for judging the detection result are added to the information output device and an audio output means for outputting the operation status in voice is added to the computer. A second display means for displaying the operation status is mounted in the information output device. Or, a display means for displaying the operation status of the information output device is mounted in the computer.

The first communication means in the computer controls communication with the information output device and the second communication means in the information output device controls communication with the computer. The control processing means operates and generates control signals for exercising various types of control for the information output device on the basis of control instructions from the second communication means and compares the identification number of the computer stored in the memory means with the identification number sent from the computer via the first and second communication means. When a comparison result match occurs, the control processing means controls a predetermined part in the information output device.

In the memory means mounted in the computer, the identification number for identifying the information output device is stored beforehand. When the identification number which is sent from the information output device via the second and first communication means matches with the identification number which is stored in the memory means beforehand, the computer communicates with the information output device.

When no comparison result match occurs, the above control processing means controls so that information which is sent from the computer to the information output device is not normally outputted from the information output device. By doing this, information of a computer user will not be indicated carelessly.

When the second communication means has a plurality of communication interfaces, it can communicate with another plurality of information output devices and the computer and in the state that a plurality of similar information output devices are connected to the computer, it can exercise various types of control for the information output devices and can inform the computer of the status of each information output device.

The detection means detects the internal operation status of the information output device and the control processing means judges the detection result. The audio output means indicates the operation status of the information output device in voice on the basis of the judgment result which is sent from the information output device to the computer via the second and first communication means. Furthermore, the display means mounted in the information output device displays the above operation status. The display means mounted in the computer performs the same operation as that of the display means mounted in the information output device. In this case, information which is sent to the computer via the second and first communication means is used as display information.

BRIEF DESCRIPTION OF THE DRAWINGS

FIG. 2 is a memory map showing the contents of the memory in the display device shown in FIG. 1.

FIG. 12 is a block diagram showing the eighth embodiment of the present invention.

DETAILED DESCRIPTION OF THE PREFERRED EMBODIMENTS

The embodiments of the present invention will be explained with reference to the accompanying drawings hereunder.

Figure 1:
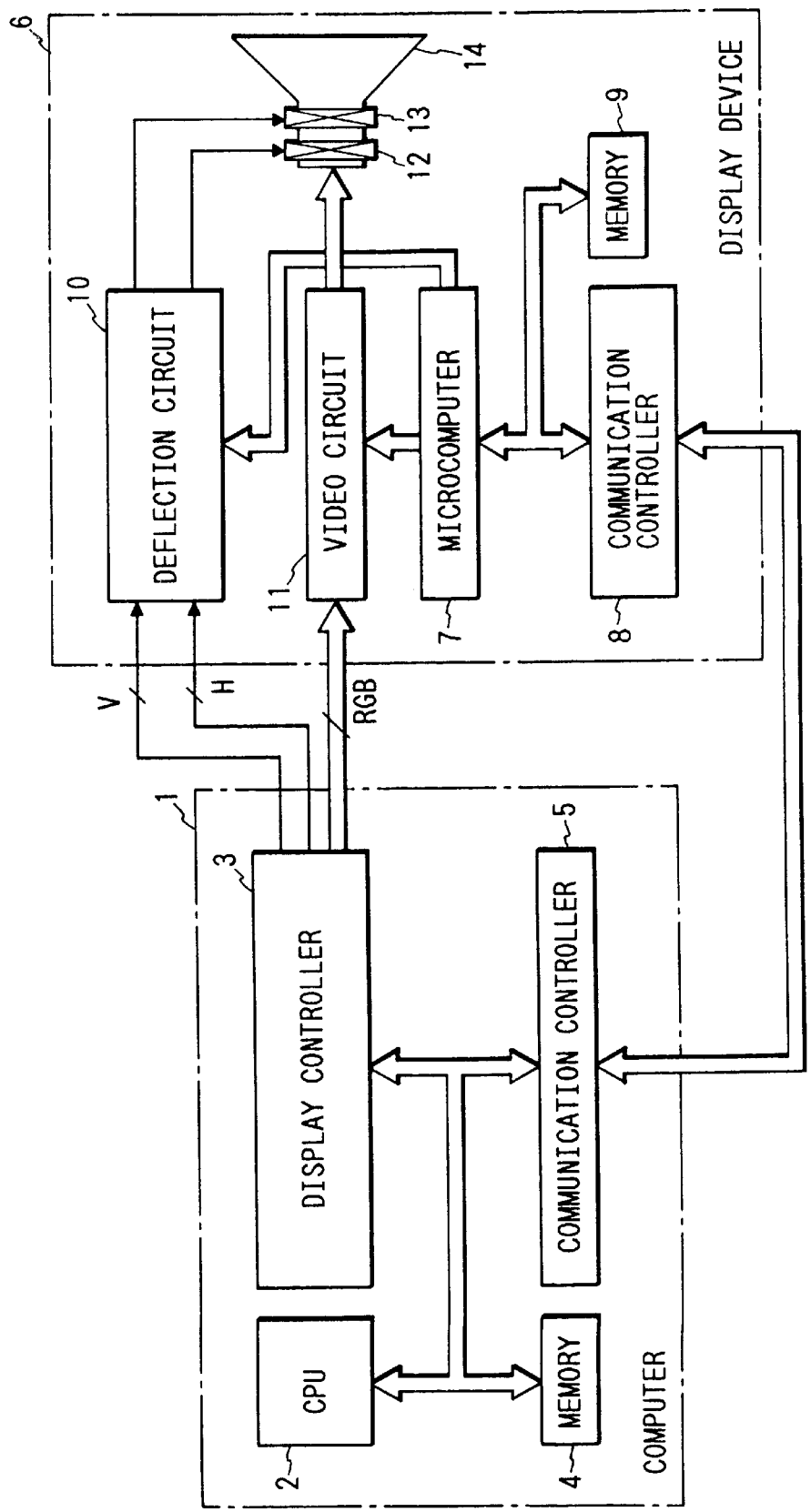
FIG. 1 is a block diagram showing the first embodiment of the present invention.

FIG. 1 is a block diagram showing the first embodiment of the present invention. In the drawing, a section 1 enclosed by a chained line indicates a computer. In the section 1, a reference numeral 2 indicates a CPU (central processing unit), 3 a display controller for generating various signals for video display, 4 a memory, and 5 a communication controller for communicating with peripheral devices. In addition, a magnetic recording unit is mounted as a data storage device which is not shown in the drawing.

A section 6 enclosed by another chained line indicates a so-called multi-scan display device which can be applied to various video signal specifications. In the section 6, a reference numeral 7 indicates a microcomputer for controlling display of the display device 6, 8 a second communication controller for communicating with the above communication controller 5, 9 a second memory, 10 a general deflection circuit of the display device, 11 a video circuit of the display device, 12 a horizontal deflection yoke, 13 a vertical deflection yoke, and 14 a color cathode-ray tube (hereinafter called a CDT (color display tube)) for displaying color images.

The operation shown in FIG. 1 is as shown below. The computer 1 has a structure which is the same as the general structure of a conventional personal computer or work station and the communication controller 5 controls a communication interface such as RS-232C which is installed in the standard type. When a control instruction of the display device 6 is inputted firstly by a user of the computer from a general keyboard which is not shown in the drawing of the computer 1, it is coded digitally by a keyboard controller which is neither shown in the drawing and CPU 2 identifies the instruction and controls the communication controller 5. The communication controller 5 sends the control instruction of the display device to the display device 6. When a control instruction of the display device 6 which is included in the software for allowing the computer 1 to operate is read from the external storage device such as a floppy disk drive or hard disk drive which is not shown in the drawing, CPU 2 identifies the instruction and controls the communication controller 5. The communication controller 5 also sends the control instruction of the display device to the display device 6.

Next, the display device 6 sends the control instruction from the computer 1 which is received by the communication controller 8 to the microcomputer 7. The microcomputer 7 identifies this control instruction and generates control signals to the relevant portions to be adjusted in the deflection circuit 10 or video circuit 11. The aforementioned deflection circuit 10 and video circuit 11 can be adjusted in the same way as with a conventional multiscan display and the adjustment means has a structure which is the same as that of a conventional multiscan display. By doing this, the display size and position, brightness, contrast, and hue of images displayed on the CDT 14 are made most suitable to a user of the computer system.

Furthermore, WYSIWYG (what you see is what you get) control which makes an image displayed on the display device 6 similar to print output of an output device other than the display, for example, a printer can be realized only by sending a control instruction for changing the display position and size to the display device 6 instead of operating and generating display data by the computer 1. The interface part of the above display device 6 such as the communication control terminal is mounted on the back or side of the display device from a viewpoint of easy connection to the computer 1 and appearance.

Furthermore, the aforementioned communication function is used for adjustment at a factory. In this case, necessary information is all written into the memory 9 in the display device 6. FIG. 2 is a memory map showing the contents of the memory 9 in the display device 6. For adjustment at factory, data to be written can be all set. In a case other than factory adjustment, namely, for adjustment in a system as shown in FIG. 1, to prevent data requiring no rewriting, namely, preset values at factory such as, for example, the number of all data or the data within the corresponding frequency range from being erased by mistake or rewritten, the computer 1 sends the ID number and the microcomputer 7 in the display device 6 checks the ID number with the registered ID number stored in the memory 9.

Figure 3:
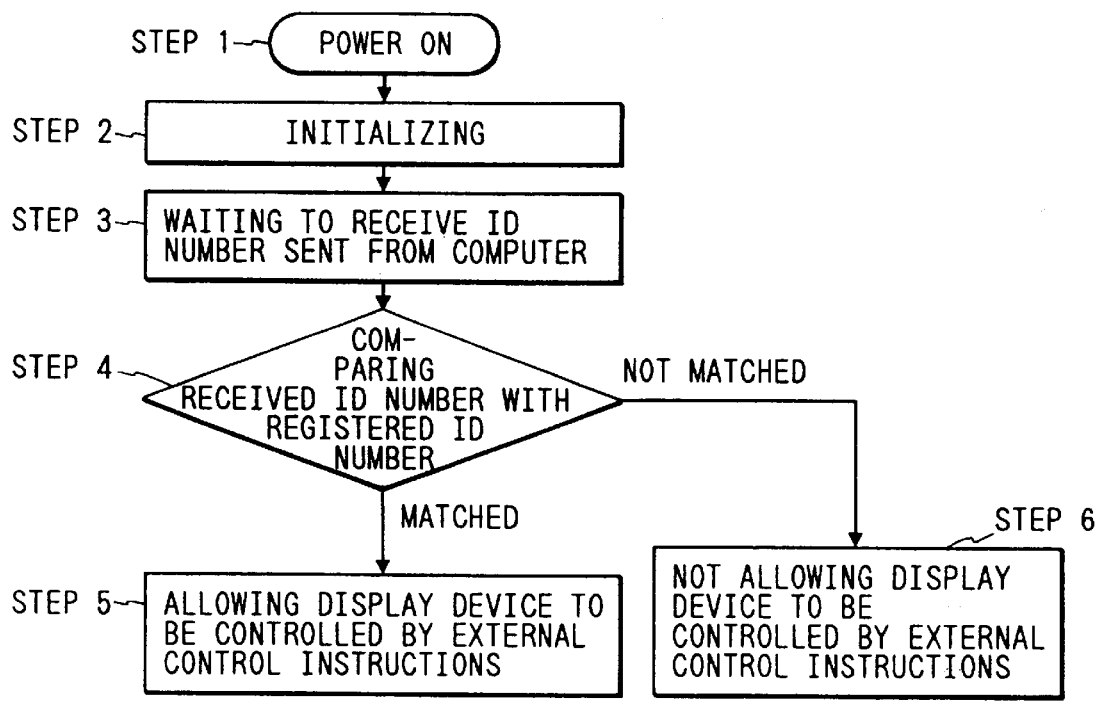
FIG. 3 is a flow chart showing the operation of the essential section shown in FIG. 1.

A flow chart of this check is shown in FIG. 3. As shown in the drawing, when the computer 1 and display device 6 are turned on at Step 1, each device is initialized at Step 2. Concretely, CPU 2 and the microcomputer 7 read the starting system software and put the peripheral circuit to be connected to the CPU into the active state so that the next operation can be performed. Then, at Step 3, the microcomputer 7 in the display device 6 waits for sending of the identification number assigned to the computer 1, that is, the so-called ID number from the computer 1. Next, at Step 4, the microcomputer 7 receives the ID number which is sent from the computer 1 and checks whether the received ID number is registered in the registered ID number list which is stored in the memory 9 in the display device 6.

When it is registered, at Step 5, the computer 1 is allowed to control the display device 6 by external control instructions so that the user control of the display size, position, brightness, and contrast can be performed by control instructions sent from the computer 1 thereafter. On the other hand, when the received ID number is not registered in the memory 9, at Step 6, the display device 6 is not allowed to be controlled by external control instructions thereafter. Therefore, even if any control instruction is sent from the computer 1, the display device 6 will not accept it.

Or, at Step 5, the computer 1 may be allowed to perform all the adjustments which can be performed by the display device 6, that is, the same control as that for adjustment at factory and at Step 6, a part of the control of the display device 6 such as display control may be allowed.

By doing this, the display device 6 can be prevented from careless control.

The above is an example that an ID number is sent to the display device 6 from the computer 1. However, needless to say, the reverse case of the above is possible. Namely, an ID number is sent to the computer 1 from the display device 6 so that the computer 1 identifies that the display device 6 having a communication function is connected and the computer 1 compares the ID number with the ID number registered in the computer 1. When the corresponding ID number is registered, the computer 1 controls the display device 6 by a predetermined control instruction. When it is not registered, the computer 1 judges that it cannot control the display device 6 and will not control the display device 6.

By doing this, the computer 1 communicates with a specific display device 6 and can exercise control such as changing the color temperature of an image displayed on the display device 6 or changing the display size depending on the application software.

According to this embodiment, RS-232C is used as a communication interface. However, a general-purpose interface such as RS-422, RS-423, SCSI or GP-IB, or network interface may be used. Furthermore, the embodiment may be applied to an interface using optical signals instead of electric signals. The above interface may be installed in the neighborhood of the rear cabinet or lower pedestal of the display device 6 for convenience of a user.

Figure 4:
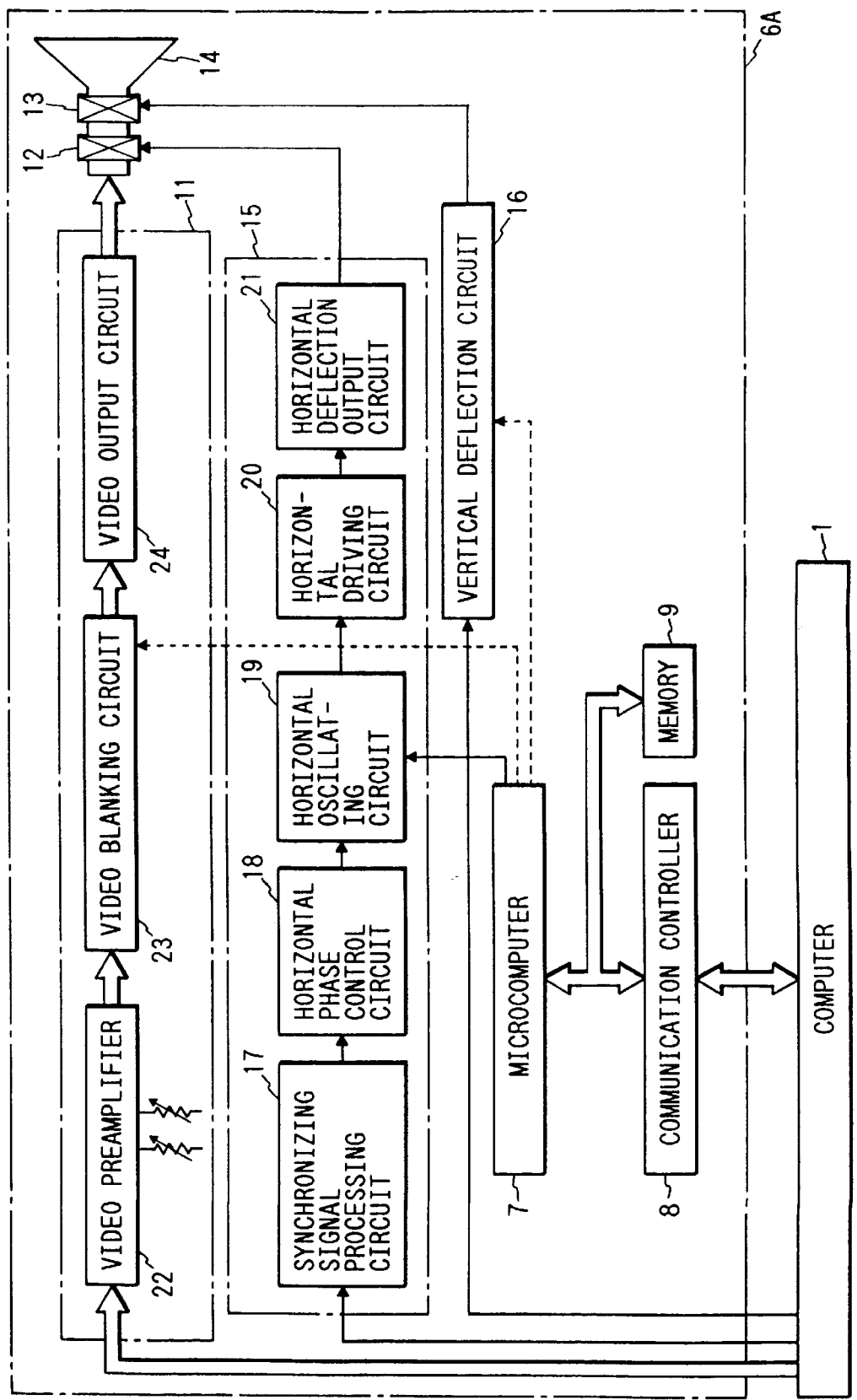
FIG. 4 is a block diagram showing the second embodiment of the present invention.

FIG. 4 is a block diagram showing the second embodiment of the present invention. According to this embodiment, when the ID number sent from the computer to the display device is not registered in the memory 9, another operation which is different from the operation shown in the first embodiment is performed. Namely, according to this embodiment, when the ID numbers do not match with each other, nothing is displayed on the display device so as to enhance the secrecy of information.

Next, the structure of FIG. 4 will be explained. In the drawing, a reference numeral 6A indicates another display device which is different from the display device 6 shown in FIG. 1, 15 a horizontal deflection circuit, 16 a vertical deflection circuit, 17 a synchronizing signal processing circuit, 18 a horizontal phase control circuit, 19 a horizontal oscillating circuit, 20 a horizontal driving circuit, 21 a horizontal deflection output circuit, 22 a video pre-amplifier circuit, 23 a video blanking circuit, and 24 a video output circuit. The other reference numerals which are the same as those shown in FIG. 1 indicate the same functions. The video circuit 11 is a general video circuit consisting of the video pre-amplifier circuit 22, video blanking circuit 23, and video output circuit 24. The horizontal deflection circuit 15 is a general deflection circuit consisting of the synchronizing signal processing circuit 17, horizontal phase control circuit 18, horizontal oscillating circuit 19, horizontal driving circuit 20, and horizontal deflection output circuit 21. The vertical deflection circuit 16 is also a general circuit which has a structure similar to that of the horizontal deflection circuit 15.

Next, the operation shown in FIG. 4 will be explained. In the drawing, an ID number sent from the computer 1 is inputted into the microcomputer 7 via the communication controller 8. The microcomputer 7 checks the above ID number with the ID number stored in the memory 9. When the ID number stored in the memory 9 matches with the ID number sent from the computer 1, the microcomputer 7 receives the control from the computer 1.

On the other hand, when the check results do not match with each other, the microcomputer 7 controls the horizontal oscillating circuit 19, fixes the oscillation frequency to a predetermined value, and allows the display device 6A to perform a horizontal deflection operation at a value different from the horizontal frequencies of the video signal and synchronizing signal which are sent from the computer. Therefore, the image displayed on the CDT 14 is not synchronized horizontally in this case and the screen content cannot be judged. When the vertical deflection circuit 16 is controlled in the same way, the image displayed on the CDT 14 is not synchronized vertically on the screen. By controlling the video blanking circuit 23 of the video circuit 11, the video display period may be blanked so that no image is displayed on the CDT 14.

By using the aforementioned methods independently or combined, only when a user of the computer system enters a predetermined ID number from the keyboard, it is displayed correctly on the display device 6A and information displayed on the CDT 14 can be prevented from careless indication.

Figure 5:
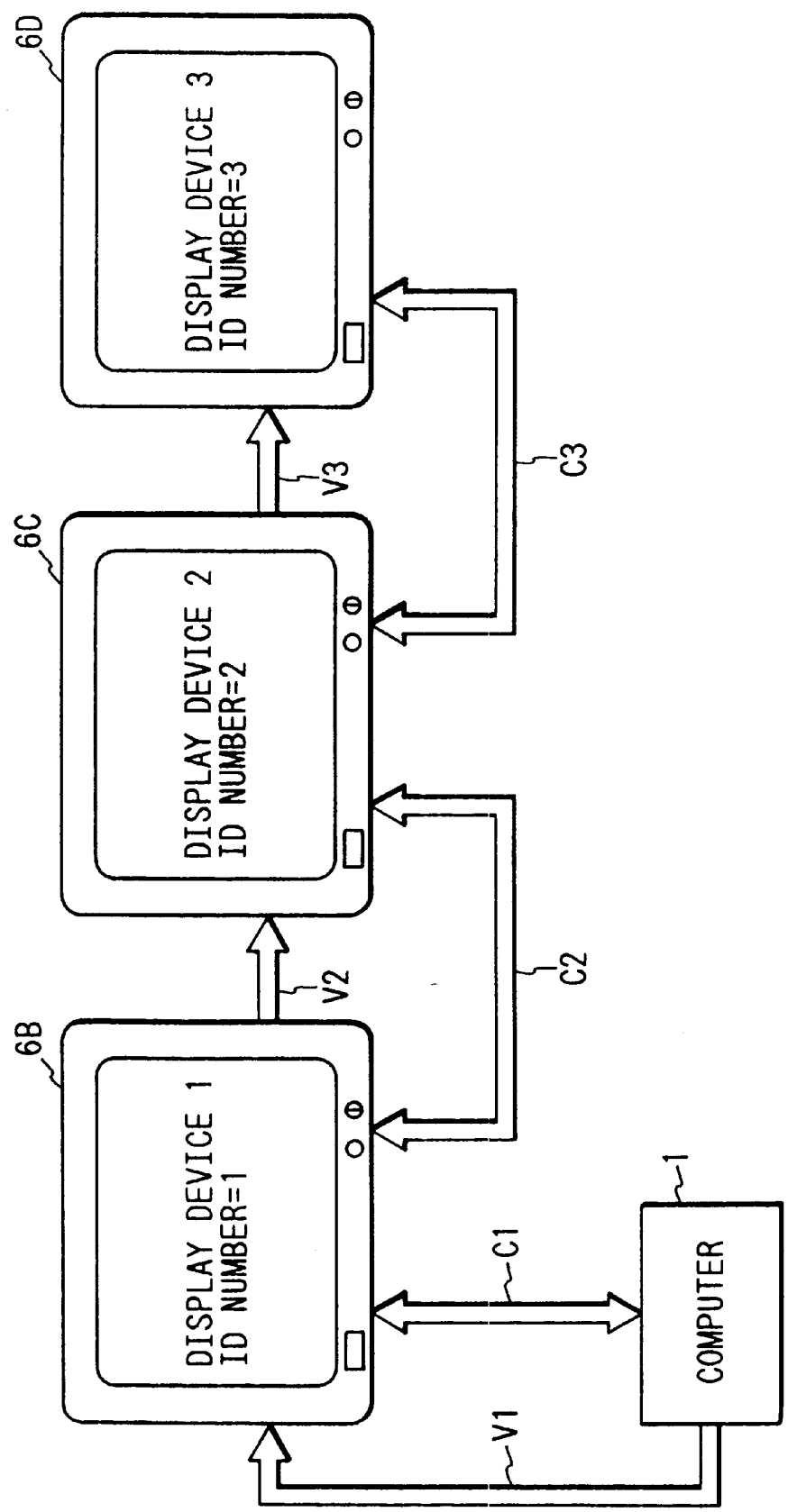
FIG. 5 is a block diagram showing the third embodiment of the present invention.

FIG. 5 is a block diagram of the third embodiment of the present invention. According to this embodiment, the display device is provided with a plurality of communication functions and a plurality of display devices can be connected with the communication interface. In the drawing, reference numerals 6B, 6C, and 6D indicate display devices having the same structure, V1, V2, and V3 lines for video signals and synchronizing signals, C1, C2, and C3 communication lines for, for example, RS-232C, and 1 the aforementioned computer. Each of the display devices 6B, 6C, and 6D has a plurality of video signal I/O terminals and communication interface I/O terminals and a registered ID number. According to this embodiment, as shown in FIG. 5, 1 is assigned to the display device 6B as an ID number, 2 to the display device 6C as an ID number, and 3 to the display device 6D as an ID number.

Next, the operation shown in FIG. 5 will be explained. In the drawing, for example, when controlling the display device 6B from the computer 1, the ID number 1 is sent to the line C1 and the display device 6B is controlled appropriately from the computer 1. Next, when controlling the display device 6C, the ID number 2 is sent from the computer 1 in the same way. Then, the ID number is received by the display device 6C via the lines C1 and C2 and the display device 6C can be controlled appropriately from the computer 1.

Since a plurality of display devices can be controlled by a computer in this way, a plurality of display devices can be adjusted at a time, for example, at the time of delivery adjustment at a factory. Furthermore, by using a multi-display system for displaying an image by assembling a plurality of display devices and for displaying various images on each screen, the display devices can be hued and adjusted in brightness simply.

Figure 6:
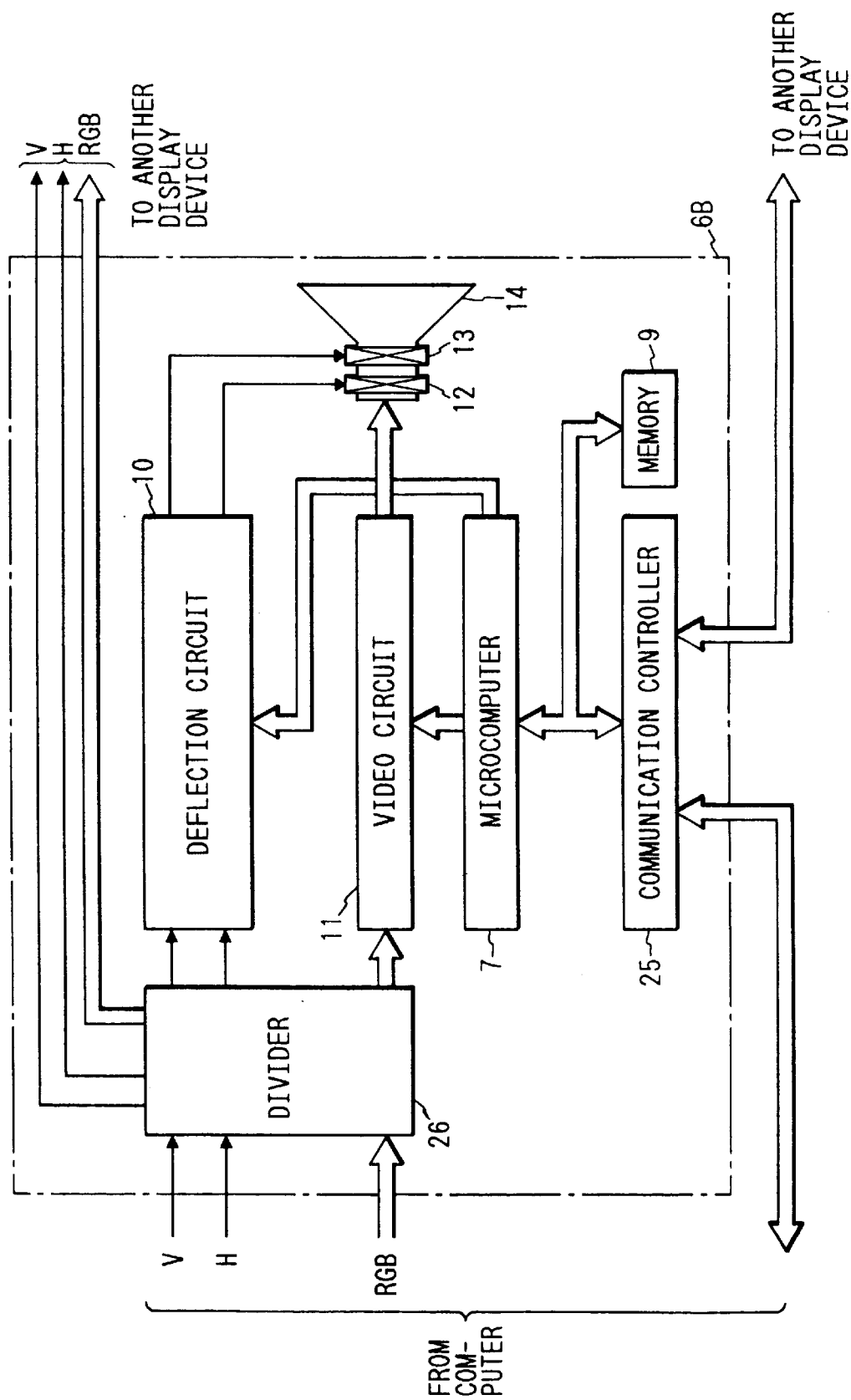
FIG. 6 is a block diagram showing the internal structure of the display device 6B shown in FIG. 5.

FIG. 6 is a block diagram showing the internal structure of the display device 6B shown in FIG. 5. In the drawing, a reference numeral 25 indicates a communication controller having two communication ports and 26 a divider of video signals and synchronizing signals. The communication controller 25 sends or receives data to or from the computer 1 in the same way as the communication controller 8 of the display device 6 shown in FIG. 1 and also divides the communication lines and relays other display devices. On the other hand, the divider 26 divides video signals or synchronizing signals sent from the computer 1 or signal source to other display devices. By using such a structure, a plurality of display devices can be connected to a computer as shown in FIG. 5.

Figure 7:
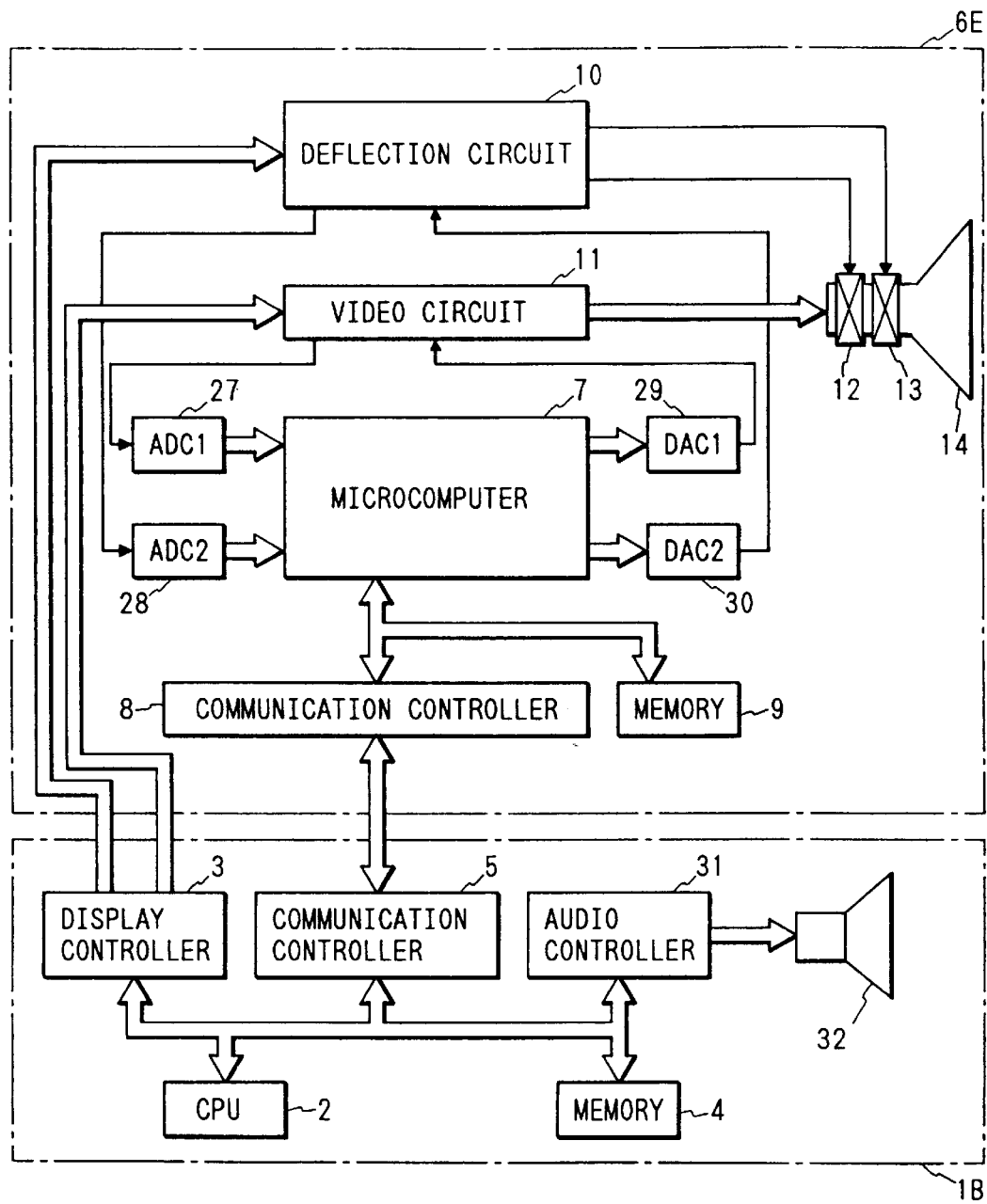
FIG. 7 is a block diagram showing the fourth embodiment of the present invention.

Next, the fourth embodiment of the present invention will be described. FIG. 7 is a block diagram showing the fourth embodiment of the present invention. In the drawing, a reference numeral 1B indicates a computer, 31 an audio control circuit for producing a sound, 32 a speaker, 6E a display device, 27 and 28 analog-digital converters (hereinafter abbreviated to ADC), and 29 and 30 digital-analog converters (hereinafter abbreviated to DAC). The other reference numerals which are the same as those shown in FIG. 1 indicate the same functions. The operation of FIG. 7 will be explained hereunder with reference to the operation flow chart shown in FIG. 8.

Figure 8:
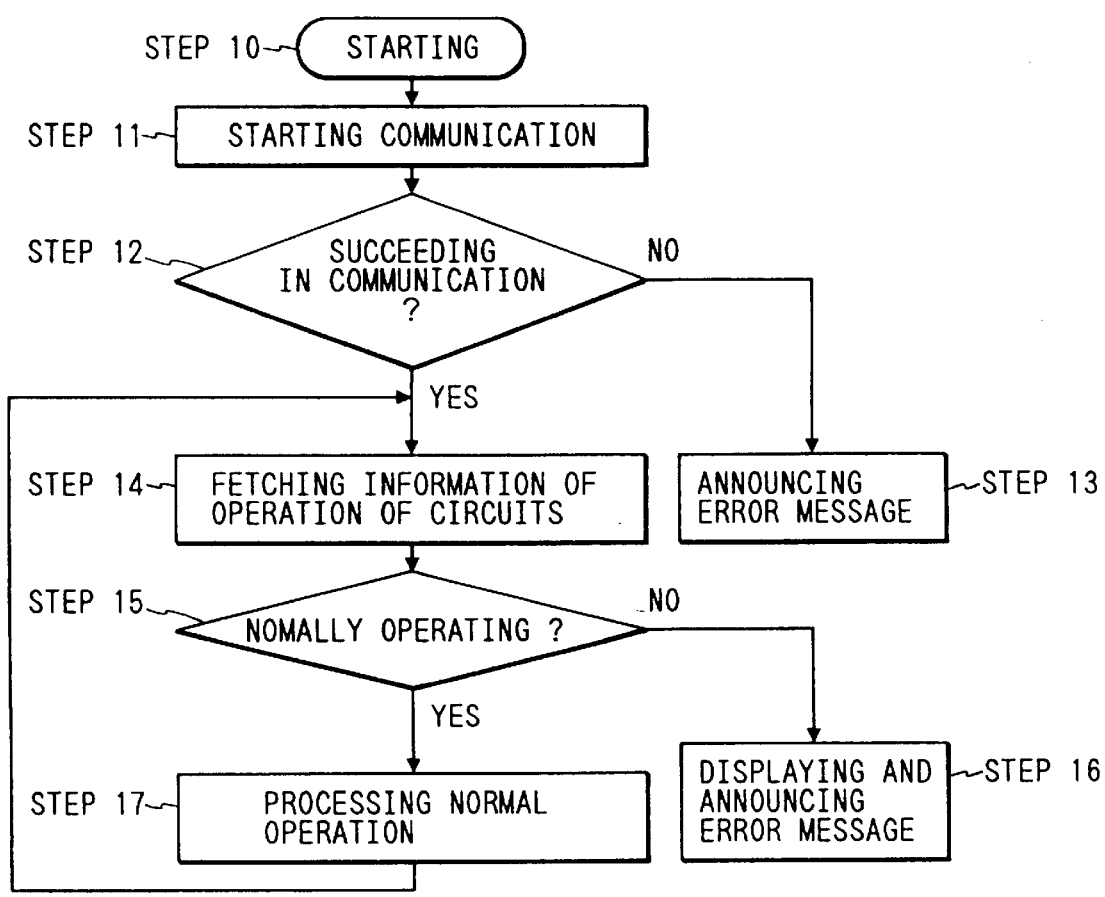
FIG. 8 is a flow chart showing the operation outline shown in FIG. 7.

When the computer 1B and display device 6E are started at Step 10 as shown in FIG. 8, they start communication with each other via the communication controllers 5 and 8 at Step 11 next. Then, at Step 12, the computer 1B calls the display device 6E. When no response is received, the computer 1B judges that the display device 6E is faulty, starts the audio control circuit 31 at Step 13, and informs the user of the computer 1B that the display device 6E is faulty from the speaker.

When the communication succeeds, at Step 14, the microcomputer 7 fetches information of the operation status of the deflection circuit 10 or video circuit 11 in the display device 6E from the voltage at a predetermined part in the circuit as digital information via the ADCs 27 and 28. Next, at Step 15, the microcomputer 7 judges whether the value which is fetched at Step 14 is a value in the normal operation status. When the microcomputer 7 judges it as an error, it informs the computer 1B of the faulty value via the communication controller 8 and CPU 2 of the computer 1B allows the audio control circuit 31 to operate and generates a message informing an error of the display device 6E from the speaker 32. Furthermore, CPU 2 allows the display controller 3 to operate and displays also a message informing an error on the CDT 14 via the video circuit 11.

In this case, when an indication code informing the faulty part is sent to the computer 1B from the display device 6E simultaneously, the computer 1B judges the indication code and can inform the user or a customer engineer of the display device 6E of the faulty part by sound or display.

When the display device 6E is normal at Step 15, the computer 1B can exercise the communication control such as the display size, hue, and brightness of the display device 6E at Step 17. At this step, when a control instruction is sent to the display device 6E from the computer 1B, the microcomputer 7 decodes the instruction and outputs the control code to the corresponding DAC 29 or 30. The DAC 29 or 30 controls a predetermined control part at the DC control voltage corresponding to the above control code and controls the display size, position, and hue of the image displayed on the CDT 14. When the above series of operations ends, the computer 1B returns to Step 14 and repeats the operations from the monitor mode of a faulty operation of the display device 6E to the normal operation at Step 17.

As mentioned above, the computer 1B can be informed of a faulty operation by using the communication function of the display device 6E. Therefore, the user can judge the faulty part and can maintain the system easily.

Figure 9:
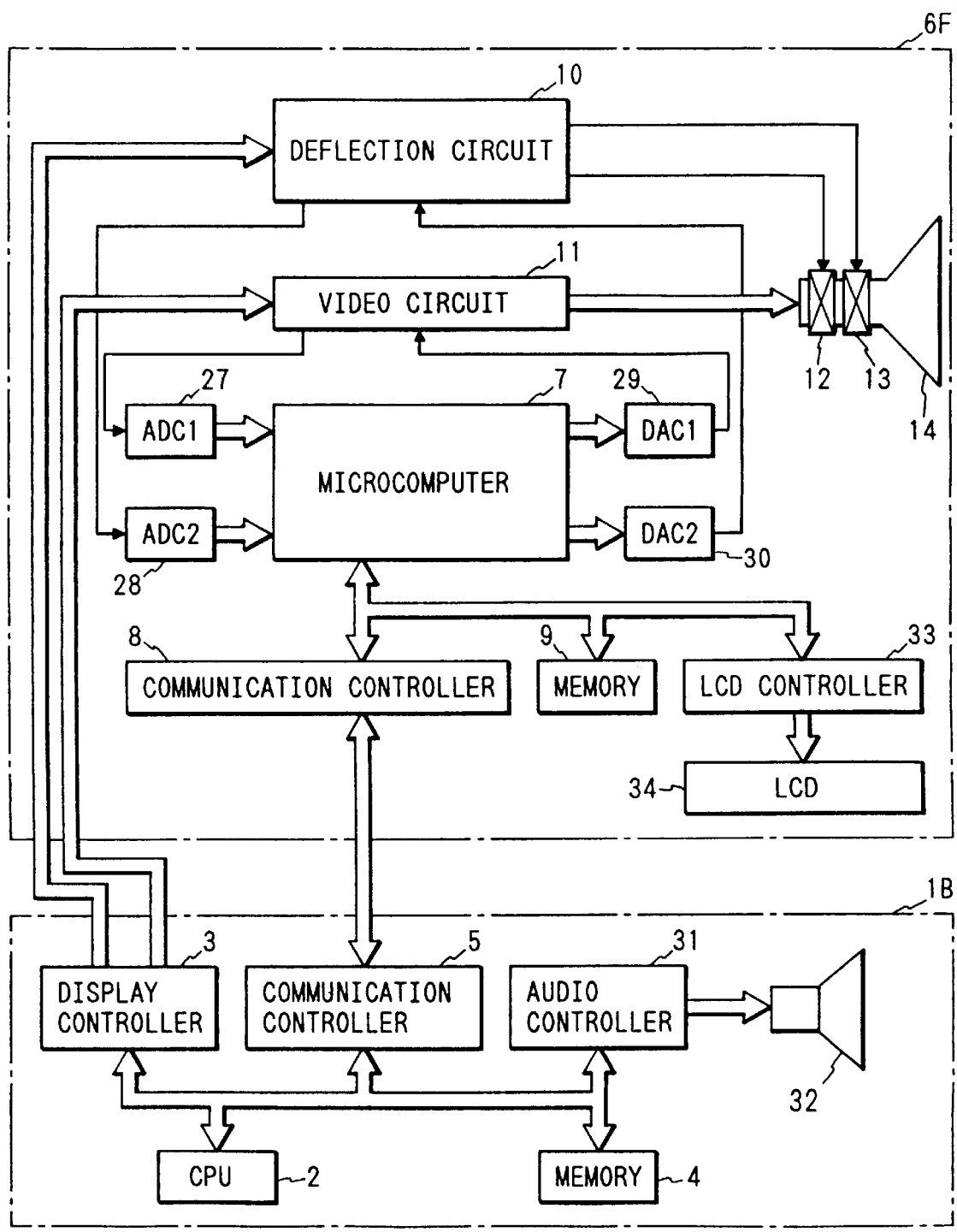
FIG. 9 is a block diagram showing the fifth embodiment of the present invention.

FIG. 9 is a block diagram showing the fifth embodiment of the present invention. This embodiment obtains the same effect as that of the embodiment shown in FIG. 7. In FIG. 9, a reference numeral 6F indicates a display device, 33 a liquid. crystal display controller in the display device 6F, and 34 a liquid crystal display panel mounted in the display device 6F. The other reference numerals which are the same as those shown in FIGS. 1 and 7 indicate the same functions.

The operation shown in FIG. 9 is basically the same as that shown in FIG. 7. The operation of the deflection circuit 10 or video circuit 11 is monitored by the microcomputer 7 via the ADC 27 or 28. When an error occurs, the microcomputer 7 transmits an indication code informing the occurrence of an error to the computer 1B via the communication line and informs the user of it by voice from the speaker 32.

Furthermore, the microcomputer 7 allows the liquid crystal display controller 33 in the display device 6F to operate and displays information of the occurrence of the fault and faulty part on the liquid crystal display panel 34. By doing this, information when an error occurs in the display device 6F can be obtained more surely.

Figure 10:
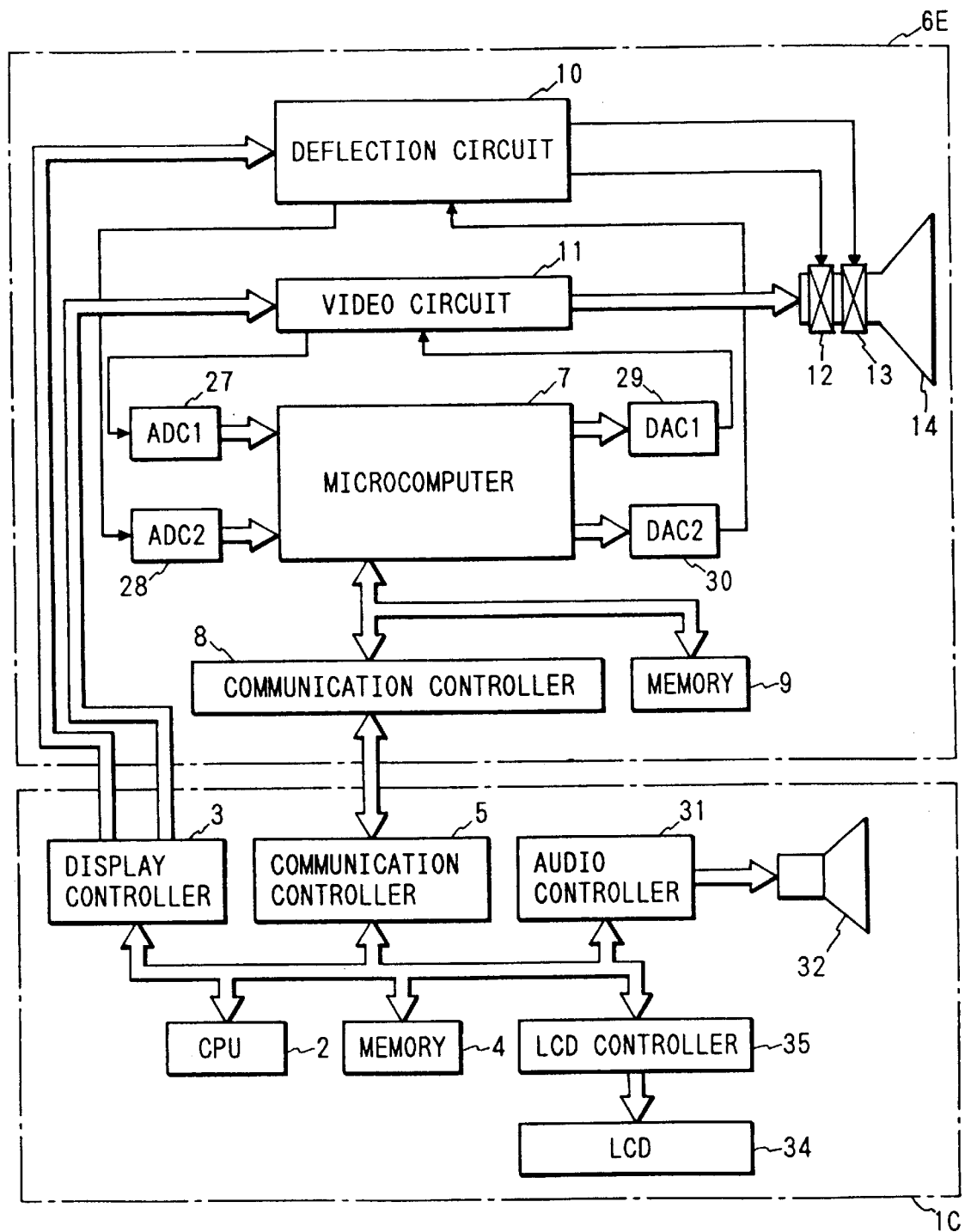
FIG. 10 is a block diagram showing the sixth embodiment of the present invention.

FIG. 10 is a block diagram showing the sixth embodiment of the present invention. This embodiment obtains the same effect as that of the embodiment shown in FIG. 9. In FIG. 10, a reference numeral 1C indicates a computer and 35 a liquid crystal display controller in the computer 1C. The other reference numerals which are the same as those shown in FIGS. 1 and 9 indicate the same functions. In FIG. 10, the display function for a fault and faulty operation of the display device shown in FIG. 9 is mounted in the computer 1C.

Namely, when an error occurs in the internal circuit of the display device 6E, the voltage detected by the ADC 27 or 28 is digitized and processed by the microcomputer 7 as faulty voltage occurrence information and information informing an error is transmitted to the computer 1C via the communication controller 8. In the computer 1C, CPU 2 decodes the transmitted faulty information. When CPU 2 identifies the faulty part of the display device 6E, it allows the audio control circuit 31 to operate as an audio signal and informs the user of the fault by an audio message from the speaker 32 on one hand. On the other hand, CPU 2 controls the liquid crystal display controller 35 so as to display characters or graphics on the liquid crystal display panel 34. By doing this, the user of the display device 6E can be informed of an error or fault of the display device 6E and can maintain the system easily.

Figure 11:
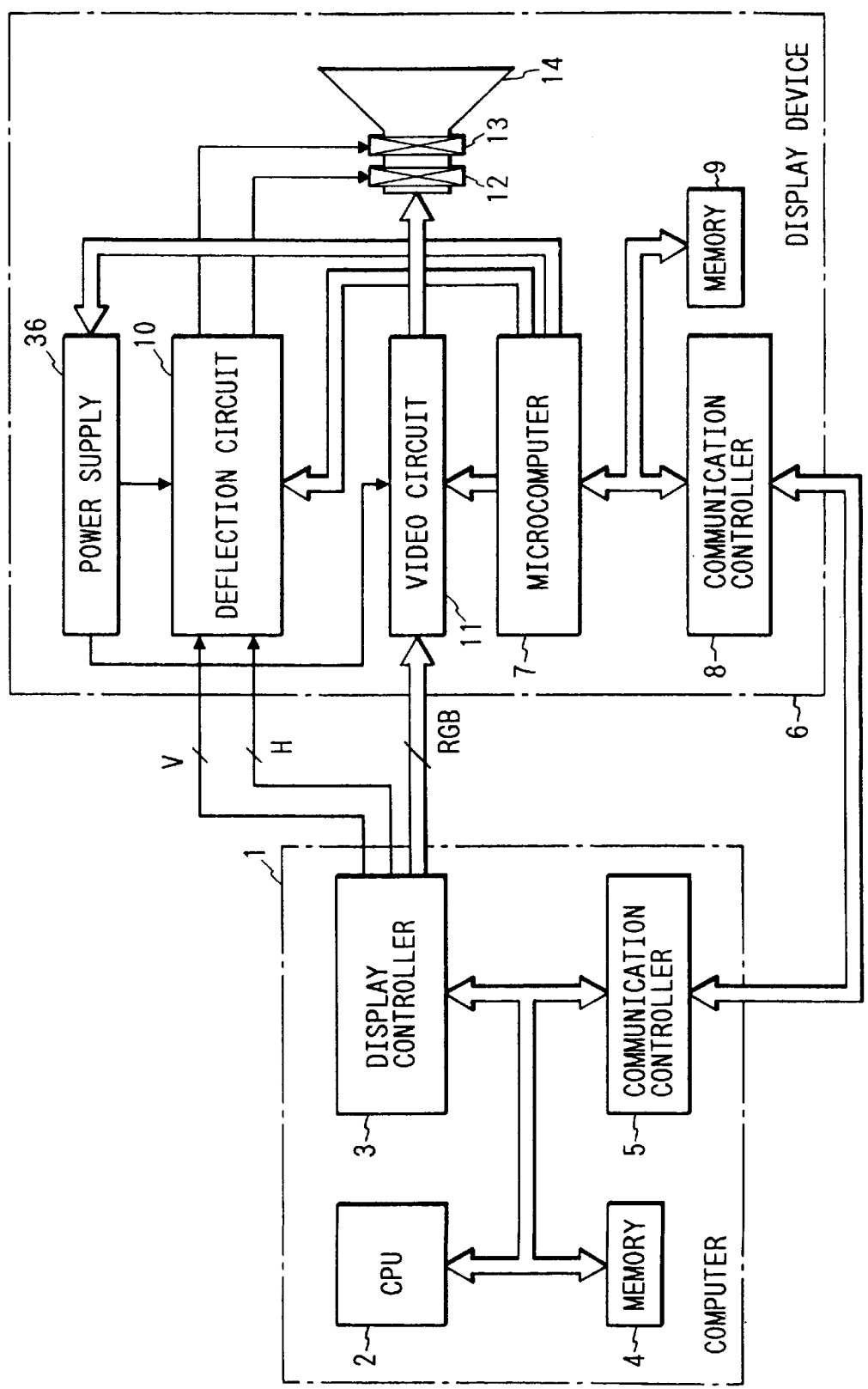
FIG. 11 is a block diagram showing the seventh embodiment of the present invention.

FIG. 11 is a block diagram showing the seventh embodiment of the present invention. In the drawing, a reference numeral 36 indicates a power supply of the deflection circuit 10 and video circuit 11. The other reference numerals which are the same as those shown in FIG. 1 indicate the same functions.

Next, the operation shown in FIG. 11 will be explained. In FIG. 11, when a control instruction to the display device 6 is issued from CPU 2 of the computer 1, the communication controller 5 changes the control instruction to a one in the signal format suited to communication and sends it to the display device 6. The display device 6 returns the signal received by the communication controller 8 to the control instruction which can be identified by the microcomputer 7 and sends it to the microcomputer 7. The microcomputer 7 judges the control instruction and decides the part of a predetermined section in the display device 6 to be controlled.

When the control instruction relates to control of the power supply 36 and is an instruction for stopping power supply from the power supply 36 to the deflection circuit 10, or video circuit 11, or both circuits, the microcomputer 7 controls the power supply 36 so as to stop the above power supply. Therefore, the image display on the CDT 14 is also stopped.

By doing this, for example, when the computer 1 is not in operation for a predetermined period, the operation power supply for the display device 6 can be automatically put into the off state. Therefore, unnecessary power consumption can be restrained and the life span of the display device can be lengthened. The aforementioned is power supply off control. However, needless to say, power supply on control is also possible. Namely, in this case, when the computer 1 is turned on or the computer 1 is changed from the function stop state to the active state, the microcomputer 7, power supply 36, deflection circuit 10, and video circuit 11 perform the reverse operation of the aforementioned so that the display device automatically starts to display.

FIG. 12 is a block diagram showing the eighth embodiment of the present invention. In the drawing, a reference numeral 37 indicates a display controller and the other numerals which are the same as those shown in FIG. 1 indicate units performing the same functions as those shown in FIG. 1.

Next, the operation of FIG. 12 will be explained. In FIG. 12, video information is sent to the display device 6 from the communication controller 5 in addition to a control instruction of the display device 6 which is explained in the embodiment shown in FIG. 1. This video information is a digital signal in the same way as a signal which is inputted to the display controller 3 in the embodiment shown in FIG. 1. The communication controller 8 of the display device 6 sends video information among the received signals to the display controller 37. The display controller 37 performs an operation which is the same as that of the display controller shown in FIG. 1 and generates a video signal to be inputted to a general display. By doing this, also in the embodiment shown in FIG. 12, an effect which is the same as that shown in FIG. 1 can be obtained. Furthermore, in FIG. 12, since video information is transmitted via a communication interface which is connected between the computer 1 and display device 6, a video signal line which is conventionally necessary is not necessary.

According to the present invention, a user of a computer can exercise various types of control for an information output device such as a display device from the keyboard of the computer or by the software incorporated in the computer. Therefore, the operability of the computer system is improved so that the system can be used easily and the user can obtain a desired information output status easily.

When an identification number is set to each device, a value which is set by the above control will not be lost by a careless operation of a user. By setting an identification number for a specific user, the secret of information can be protected inversely. Since the power supply for the information output device can be controlled by the computer when necessary, unnecessary power consumption can be restrained.

Since the status of the information output device can be monitored simply, the system can be protected against a malfunction and maintained easily. Furthermore, the aforementioned control hardware can be realized in a minimum structure.

What is claimed is:

1. A display unit comprising:

means for receiving video signals for video display from a video source;

memory means for storing at least display unit information, wherein said display unit information includes an identification number for uniquely identifying the display unit; and a communication controller capable of bi-directionally communicating with the video source;

wherein said communication controller communicates the display unit information to the video source and the display unit receives a signal from the video source that is generated based on the display unit information.

2. A display unit according to claim 1, wherein the video source is a computer.

3. A display unit comprising:

a video circuit adapted to display video signals sent by a video source;

a memory in which at least display unit information is stored, wherein said display unit information includes an identification number for uniquely identifying the display unit; and a communication controller capable of bi-directionally communicating with the video source;

wherein said communication controller communicates the display unit information from the display unit to the video source and said display unit receives a signal from said video source that is generated based on the display unit information.

4. A display unit according to claim 3, wherein the video source is a computer.

\* \* \* \* \*

UNITED STATES PATENT AND TRADEMARK OFFICE
CERTIFICATE OF CORRECTION

PATENT NO. : 6,247,090 C1  Page 1 of 1
APPLICATION NO. : 90/009438
DATED : July 20, 2010
INVENTOR(S) : Ikuya Arai and Kouji Kitou It is certified that error appears in the above-identified patent and that said Letters Patent is hereby corrected as shown below:

Column 1, lines 33-35, delete claim 9 and insert the following claim:

-- 9. The display unit according to claim 1, which further includes the memory means for storing preset values for adjusting the displayed image. --

Column 1, lines 39-40, delete claim 11 and insert the following claim:

-- 11. The display unit according to claim 1, which further includes the memory means for storing user adjustment data. --

Column 2, lines 4-15, delete claims 14-17 and insert the following claims:

-- 14. The display unit according to claim 3, wherein the identification number distinguishes between display units having the same structure.
   15. The display unit according to claim 3, wherein the display unit is capable of receiving control instructions from the video source to adjust the displayed image.
   16. The display unit according to claim 15, wherein the display unit is capable of stopping display of an image in response to at least one control instruction from the video source.
   17. The display unit according to claim 3, which further includes the memory storing preset values for adjusting the displayed image. --

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 6,247,090 C1  
APPLICATION NO. : 90/009438  
DATED : July 20, 2010  
INVENTOR(S) : Ikuya Arai et al.

Page 1 of 1

It is certified that error appears in the above-identified patent and that said Letters Patent is hereby corrected as shown below:

Column 2, lines 19-42, delete claims 19-26 and insert the following claims:

-- 19. The display unit according to claim 3, which further includes the memory storing user adjustment data.
20. The display unit according to claim 3, which further includes an LCD Controller that is operably connected to a liquid crystal display panel.
21. The display unit according to claim 13, wherein the display unit is capable of receiving control instructions from the video source to adjust the displayed image.
22. The display unit according to claim 21, which further includes the memory storing preset values for adjusting the displayed image.
23. The display unit according to claim 22, which further includes the memory storing user adjustment data.
24. The display unit according to claim 23, wherein the display unit is capable of stopping display of an image in response to at least one control instructions from the video source.
25. The display unit according to claim 24, wherein said preset values are for adjusting the position and contrast of the displayed image.
26. The display unit according to claim 25, which further includes an LCD Controller that is operably connected to a liquid crystal display panel. --

Signed and Sealed this  
Twenty-eighth Day of December, 2010

David J. Kappos  
*Director of the United States Patent and Trademark Office*

(12) EX PARTE REEXAMINATION CERTIFICATE (7622nd)
United States Patent
Arai et al.

(10) Number: US 6,247,090 C1
(45) Certificate Issued: Jul. 20, 2010

(54) DISPLAY APPARATUS ENABLED TO CONTROL COMMUNICATABILITY WITH AN EXTERNAL COMPUTER USING IDENTIFICATION INFORMATION

(75) Inventors: Ikuya Arai, Yokohama (JP); Kouji Kitou, Yokohama (JP)

(73) Assignee: Mondis Technology Ltd., London (GB)

Reexamination Request:
No. 90/009,438, May 6, 2009

Reexamination Certificate for:
Patent No.: 6,247,090
Issued: Jun. 12, 2001
Appl. No.: 09/265,363
Filed: Mar. 10, 1999

Related U.S. Application Data

(63) Continuation of application No. 08/833,346, filed on Apr. 4, 1997, now Pat. No. 5,887,147, which is a continuation of application No. 08/598,903, filed on Feb. 9, 1996, now Pat. No. 5,652,845, which is a continuation of application No. 08/190,848, filed on Feb. 3, 1994, now abandoned.

(30) Foreign Application Priority Data

Feb. 10, 1993 (JP) ............................................. 5-022212

(51) Int. Cl.
*G09G 1/16* (2006.01)
*G06F 3/153* (2006.01)
*G06F 3/14* (2006.01)

(52) U.S. Cl. ................................ 710/9; 710/62; 710/64; 725/105; 345/99

(58) Field of Classification Search ........................ None
See application file for complete search history.

(56) References Cited

U.S. PATENT DOCUMENTS

| | | |
|---|---|---|
| 3,177,919 A | 4/1965 | Arant |
| 3,691,295 A | 9/1972 | Fisk |
| 4,007,443 A | 2/1977 | Bromberg |
| 4,124,888 A | 11/1978 | Washburn |
| 4,145,179 A | 3/1979 | Tanaka |
| 4,145,719 A | 3/1979 | Hand |
| 4,148,070 A | 4/1979 | Taylor |
| 4,159,279 A | 6/1979 | Smith |
| 4,159,480 A | 6/1979 | Tachi |
| 4,172,264 A | 10/1979 | Taylor |

(Continued)

FOREIGN PATENT DOCUMENTS

| | | |
|---|---|---|
| DE | 2413839 | 3/1974 |
| DE | 2703579 | 1/1977 |
| DE | 2804294 | 2/1978 |
| DE | 2839888 | 9/1978 |
| DE | 3512278 | 4/1985 |
| DE | 4025295 | 8/1990 |
| EP | 0042034 | 12/1981 |
| EP | 0182097 | 5/1986 |
| EP | 0224802 | 6/1987 |
| EP | 0257684 | 3/1988 |

(Continued)

OTHER PUBLICATIONS

Davidson, K., Apr./May 1990, "CEBus Comes One Step Closer To Reality, Domestic Automation, " Circuit Cellar Ink, pp. 85–86.

Discrimination of Type of Display Device, IBM Technical Disclosure Bulletin, Oct. 1987.

(Continued)

*Primary Examiner*—Christopher E Lee

(57) ABSTRACT

In the computer, the control information for screen display incorporated in the keyboard and software is processed by CPU2 and sent to the display device via the communication controller. The microcomputer in the display device fetches the control information from the communication controller and controls a predetermined part of the video circuit or deflection circuit. In this case, identification information is sent to the display device from the computer first and when it matches with the identification information stored in the memory, the above control is permitted.

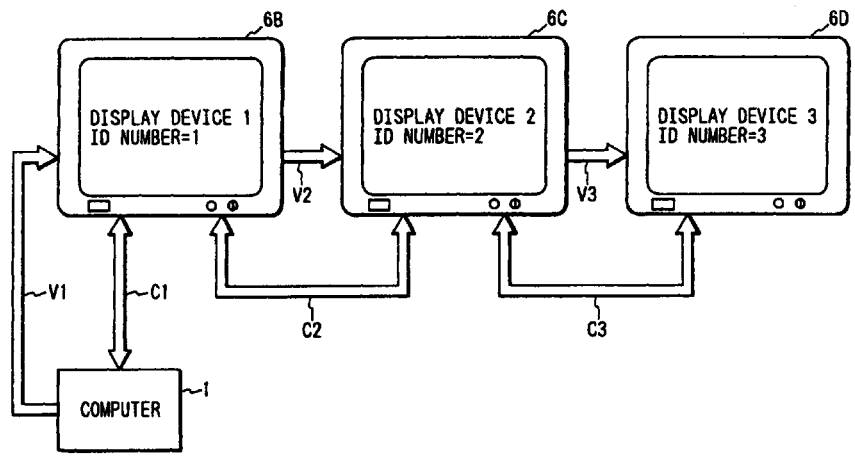

U.S. PATENT DOCUMENTS

| | | |
|---|---|---|
| 4,174,536 A | 11/1979 | Misunas |
| 4,247,908 A | 1/1981 | Lockhart, Jr. |
| 4,251,755 A | 2/1981 | Bryden |
| 4,321,597 A | 3/1982 | Martin |
| 4,338,623 A | 7/1982 | Asmus |
| 4,394,689 A | 7/1983 | Wallace |
| 4,415,985 A | 11/1983 | McDaniel |
| 4,426,679 A | 1/1984 | Yu |
| 4,429,384 A | 1/1984 | Kaplinsky |
| 4,451,824 A | 5/1984 | Thayer |
| 4,468,768 A | 8/1984 | Sunkle |
| 4,483,260 A | 11/1984 | Gallant |
| 4,497,036 A | 1/1985 | Dunn |
| 4,534,012 A | 8/1985 | Yokozawa |
| 4,536,793 A | 8/1985 | Harshbarger |
| 4,536,856 A | 8/1985 | Hiroishi |
| 4,563,677 A | 1/1986 | Seiler |
| 4,574,279 A | 3/1986 | Roberts |
| 4,589,063 A | 5/1986 | Shah |
| 4,591,974 A | 5/1986 | Dornbush |
| 4,626,837 A | 12/1986 | Priestly |
| 4,626,892 A | 12/1986 | Nortrup |
| 4,637,011 A | 1/1987 | Crabbe |
| 4,637,022 A | 1/1987 | Burke |
| 4,641,262 A | 2/1987 | Bryan |
| 4,641,263 A | 2/1987 | Perlman |
| 4,642,761 A | 2/1987 | Yanagiuchi |
| 4,654,706 A | 3/1987 | Davidson |
| 4,665,433 A | 5/1987 | Hinson |
| 4,672,501 A | 6/1987 | Bilac |
| 4,680,647 A | 7/1987 | Moriyama |
| 4,684,942 A | 8/1987 | Nishi |
| 4,689,669 A | 8/1987 | Hoshino |
| 4,689,740 A | 8/1987 | Moelands |
| 4,704,699 A | 11/1987 | Farina |
| 4,714,940 A | 12/1987 | Inoue |
| 4,727,362 A | 2/1988 | Rackley |
| 4,727,947 A | 3/1988 | Naito |
| 4,731,602 A | 3/1988 | Hata |
| 4,736,324 A | 4/1988 | Sainen |
| 4,737,772 A | 4/1988 | Nishi |
| 4,743,968 A | 5/1988 | Mogi |
| 4,745,404 A | 5/1988 | Kallenberg |
| 4,754,204 A | 6/1988 | Ando |
| 4,757,239 A | 7/1988 | Starkey |
| 4,757,443 A | 7/1988 | Hecker |
| 4,775,857 A | 10/1988 | Staggs |
| 4,779,132 A | 10/1988 | McBeath |
| 4,788,658 A | 11/1988 | Hanebuth |
| 4,789,856 A | 12/1988 | Yokota |
| 4,794,381 A | 12/1988 | Iwai |
| 4,804,948 A | 2/1989 | Nishi |
| 4,839,638 A | 6/1989 | Kosler |
| 4,868,563 A | 9/1989 | Stair |
| 4,870,531 A | 9/1989 | Danek |
| 4,875,158 A | 10/1989 | Ashkin |
| 4,884,972 A | 12/1989 | Gasper |
| 4,891,743 A | 1/1990 | May |
| 4,910,655 A | 3/1990 | Ashkin |
| 4,912,627 A | 3/1990 | Ashkin |
| 4,918,598 A | 4/1990 | Ashkin |
| 4,930,160 A | 5/1990 | Vogel |
| 4,939,652 A | 7/1990 | Steiner |
| 4,970,655 A | 11/1990 | Winn |
| 4,980,678 A | 12/1990 | Zenda |
| 4,984,190 A | 1/1991 | Katori |
| 4,990,904 A | 2/1991 | Zenda |
| 4,995,080 A | 2/1991 | Bestler |
| 5,012,339 A | 4/1991 | Kurata |
| 5,021,719 A | 6/1991 | Arai |
| 5,021,983 A | 6/1991 | Nguyen |
| 5,031,118 A | 7/1991 | Morizot |
| 5,038,301 A | 8/1991 | Thoma |
| 5,045,926 A | 9/1991 | Amano |
| 5,047,754 A | 9/1991 | Akatsuka |
| 5,051,827 A | 9/1991 | Fairhurst |
| 5,054,022 A | 10/1991 | van Steenbrugge |
| 5,059,961 A | 10/1991 | Cheng |
| 5,060,079 A | 10/1991 | Rufus-Isaacs |
| 5,065,357 A | 11/1991 | Shiraishi |
| 5,068,732 A | 11/1991 | Satoh |
| 5,072,411 A | 12/1991 | Yamaki |
| 5,073,773 A | 12/1991 | Van Steenbrugge |
| 5,092,686 A | 3/1992 | Tsukamoto |
| 5,109,434 A | 4/1992 | Shimizu |
| 5,113,259 A | 5/1992 | Romesburg |
| 5,117,070 A | 5/1992 | Ueno |
| 5,126,725 A | 6/1992 | Yanagisawa |
| 5,128,877 A | 7/1992 | Tang |
| 5,134,691 A | 7/1992 | Elms |
| 5,136,695 A | 8/1992 | Goldshlag |
| 5,138,305 A | 8/1992 | Tomiyasu |
| 5,138,565 A | 8/1992 | Satou |
| 5,140,312 A | 8/1992 | Ishii |
| 5,142,576 A | 8/1992 | Nadan |
| 5,144,290 A | 9/1992 | Honda |
| 5,150,109 A | 9/1992 | Berry |
| 5,151,997 A | 9/1992 | Bailey |
| 5,159,683 A | 10/1992 | Lvovsky |
| 5,164,819 A | 11/1992 | Music |
| 5,166,893 A | 11/1992 | Hosoi |
| 5,175,750 A | 12/1992 | Donovan |
| 5,189,401 A | 2/1993 | Kugler |
| 5,202,961 A | 4/1993 | Mills |
| 5,216,504 A | 6/1993 | Webb |
| 5,222,212 A | 6/1993 | Johary |
| 5,227,863 A | 7/1993 | Bilbrey |
| 5,227,881 A | 7/1993 | Wess |
| 5,228,881 A | 7/1993 | Sekiguchi |
| 5,233,547 A | 8/1993 | Kapp |
| 5,237,488 A | 8/1993 | Moser |
| 5,241,281 A | 8/1993 | Wilkes |
| 5,247,090 A | 9/1993 | Brickner |
| 5,247,286 A | 9/1993 | Ishikawa |
| 5,251,031 A | 10/1993 | Tagami |
| 5,253,060 A | 10/1993 | Welmer |
| 5,257,350 A | 10/1993 | Howard |
| 5,262,759 A | 11/1993 | Moriconi et al. |
| 5,264,992 A | 11/1993 | Hogdahl |
| 5,270,821 A | 12/1993 | Samuels |
| 5,276,438 A | 1/1994 | DiSanto |
| 5,285,197 A | 2/1994 | Schmidt et al. |
| 5,309,174 A | 5/1994 | Minkus |
| 5,313,225 A | 5/1994 | Miyadera |
| 5,315,695 A | 5/1994 | Saito |
| 5,315,711 A | 5/1994 | Barone |
| 5,319,582 A | 6/1994 | Ma |
| 5,321,750 A | 6/1994 | Nadan |
| 5,335,168 A | 8/1994 | Walker |
| 5,347,630 A | 9/1994 | Ishizawa |
| 5,371,518 A | 12/1994 | Hannah |
| 5,389,952 A | 2/1995 | Kikinis |
| 5,396,593 A | 3/1995 | Mori |
| 5,444,849 A | 8/1995 | Farrand |
| 5,446,482 A | 8/1995 | Van Aken |
| 5,446,740 A | 8/1995 | Yien |
| 5,448,554 A | 9/1995 | Van Steenbrugge |
| 5,448,697 A | 9/1995 | Parks |
| 5,491,805 A | 2/1996 | Welmer |
| 5,499,018 A | 3/1996 | Welmer |
| 5,499,040 A | 3/1996 | McLaughlin |

| | | | | | |
|---|---|---|---|---|---|
| 5,506,602 A | 4/1996 | Yokoyama | EP | 0456923 | 11/1991 |
| 5,526,043 A | 6/1996 | Wen | EP | 0468356 | 1/1992 |
| 5,532,935 A | 7/1996 | Ninomiya | EP | 0545828 | 6/1993 |
| 5,546,098 A | 8/1996 | Moriconi | EP | 0618561 | 10/1994 |
| 5,546,759 A | 8/1996 | Lee | EP | 0708399 | 10/1994 |
| 5,550,556 A | 8/1996 | Wu | EP | 0653090 | 5/1995 |
| 5,574,478 A | 11/1996 | Bril | EP | 0665525 | 8/1995 |
| 5,576,735 A | 11/1996 | Kikuchi | EP | 0760499 | 3/1997 |
| 5,592,194 A | 1/1997 | Nishikawa | EP | 0856993 | 8/1998 |
| 5,602,567 A | 2/1997 | Kanno | FI | 914435 | 3/1993 |
| 5,608,730 A | 3/1997 | Osakabe | FI | 923949 | 3/1994 |
| 5,644,513 A | 7/1997 | Rudin | GB | 2176637 | 3/1928 |
| 5,670,969 A | 9/1997 | Yamagami | GB | 1495173 | 12/1977 |
| 5,671,371 A | 9/1997 | Kondo | GB | 1568378 | 5/1980 |
| 5,686,934 A | 11/1997 | Nonoshita | GB | 2158322 | 11/1985 |
| 5,691,741 A | 11/1997 | Kerigan | GB | 2223114 | 3/1990 |
| 5,727,191 A | 3/1998 | Konishi | GB | 2235358 | 2/1991 |
| 5,740,436 A | 4/1998 | Davis | GB | 2270451 | 3/1994 |
| 5,742,273 A | 4/1998 | Flinders | JP | 54159130 | 12/1979 |
| 5,764,547 A | 6/1998 | Bilich | JP | U-57-198697 | 12/1982 |
| 5,771,028 A | 6/1998 | Dalton | JP | 58103034 | 6/1983 |
| 5,828,834 A | 10/1998 | Choi | JP | 59101695 | 6/1984 |
| 5,850,209 A | 12/1998 | Lemke | JP | A-59-171991 | 9/1984 |
| 5,910,806 A | 6/1999 | Narui | JP | 60117327 | 6/1985 |
| 5,917,462 A | 6/1999 | Suzuki | JP | 60154396 | 8/1985 |
| 5,926,155 A | 7/1999 | Arai | JP | 61285876 | 12/1986 |
| 5,943,029 A | 8/1999 | Ross | JP | 61290529 | 12/1986 |
| 5,952,990 A | 9/1999 | Inoue | JP | A-62-043975 | 2/1987 |
| 6,011,592 A | 1/2000 | Vaughan | JP | A-62-112192 | 5/1987 |
| 6,052,740 A | 4/2000 | Frederick | JP | 62136696 | 6/1987 |
| 6,057,812 A | 5/2000 | Arai | JP | 63037783 | 2/1988 |
| 6,057,860 A | 5/2000 | Hoffert | JP | A-63-097994 | 4/1988 |
| 6,078,301 A | 6/2000 | Arai | JP | 63113625 | 5/1988 |
| 6,169,535 B1 | 1/2001 | Lee | JP | 63148327 | 6/1988 |
| 6,175,356 B1 | 1/2001 | Jung | JP | A-64-010295 | 1/1989 |
| 6,219,451 B1 | 4/2001 | Hunt | JP | U-01-077693 | 5/1989 |
| 6,223,283 B1 | 4/2001 | Chaiken | JP | 2305293 | 5/1989 |
| 6,263,440 B1 | 7/2001 | Pruett | JP | A-01-196621 | 8/1989 |
| 6,285,397 B1 | 9/2001 | Webb | JP | 1274232 | 11/1989 |
| 6,300,921 B1 | 10/2001 | Moriconi | JP | H01-173787 | 12/1989 |
| 6,300,980 B1 | 10/2001 | McGraw | JP | 207696 | 1/1990 |
| 6,304,236 B1 | 10/2001 | Arai | JP | 2060193 | 2/1990 |
| 6,304,895 B1 | 10/2001 | Schneider | JP | 2077088 | 3/1990 |
| 6,346,930 B2 | 2/2002 | Arai | JP | 2103592 | 4/1990 |
| 6,348,904 B1 | 2/2002 | Arai | JP | 2127688 | 5/1990 |
| 6,437,829 B1 | 8/2002 | Webb | JP | A-02-158796 | 6/1990 |
| 6,473,060 B1 | 10/2002 | Kim | JP | 2181783 | 7/1990 |
| 6,513,088 B2 | 1/2003 | Arai | JP | 2250580 | 10/1990 |
| 6,549,970 B2 | 4/2003 | Arai | JP | 2257196 | 10/1990 |
| 6,590,547 B2 | 7/2003 | Moriconi | JP | 2293791 | 12/1990 |
| 6,590,572 B1 | 7/2003 | Hoffert | JP | A-56-001633 | 1/1991 |
| 6,618,773 B1 | 9/2003 | Chang | JP | A-03-035287 | 2/1991 |
| 6,639,588 B2 | 10/2003 | Arai | JP | 3056993 | 3/1991 |
| 6,686,895 B2 | 2/2004 | Arai | JP | 3071254 | 3/1991 |
| 6,693,622 B1 | 2/2004 | Shahoian | JP | 3118595 | 5/1991 |
| 7,089,342 B2 | 8/2006 | Arai | JP | 3148697 | 6/1991 |
| 7,475,180 B2 | 1/2009 | Arai | JP | 3150494 | 6/1991 |
| 7,475,181 B2 | 1/2009 | Arai | JP | 3160494 | 7/1991 |
| 2002/0147879 A1 | 10/2002 | Arai | JP | 3226792 | 7/1991 |
| 2002/0152347 A1 | 10/2002 | Arai | JP | 3177919 | 8/1991 |
| 2004/0061692 A1 | 4/2004 | Arai | JP | 3204059 | 9/1991 |
| 2004/0196276 A1 | 10/2004 | Arai | JP | 030204059 | 9/1991 |
| 2010/0020050 A1 | 1/2010 | Arai | JP | 3242688 | 10/1991 |
| 2010/0026627 A1 | 2/2010 | Arai | JP | 3251995 | 11/1991 |
| | | | JP | 3267841 | 11/1991 |
| FOREIGN PATENT DOCUMENTS | | | JP | 3121442 | 12/1991 |
| EP | 0303138 | 2/1989 | JP | 4021024 | 1/1992 |
| EP | 0399649 | 11/1990 | JP | A-04-027998 | 1/1992 |
| EP | 0447167 | 9/1991 | JP | 4037787 | 2/1992 |
| EP | 0448267 | 9/1991 | JP | 4168533 | 6/1992 |
| EP | 0456012 | 11/1991 | JP | 5022212 | 1/1993 |

| | | |
|---|---|---|
| JP | A-2003-76535 | 3/1993 |
| JP | A-2003-76536 | 3/1993 |
| JP | 5083719 | 4/1993 |
| JP | A-2003-99242 | 4/1993 |
| JP | A-05-119953 | 5/1993 |
| JP | 5158586 | 6/1993 |
| JP | 5244404 | 9/1993 |
| JP | 6116643 | 4/1994 |
| JP | 6129529 | 5/1994 |
| JP | 6236339 | 8/1994 |
| JP | A-03-213945 | 3/1999 |
| KR | 19930009801 | 10/1993 |
| SU | 809140 | 2/1981 |
| SU | 1427412 | 9/1988 |
| WO | WO 93/06587 | 4/1993 |

OTHER PUBLICATIONS

Floyd, T.L., Digital Fundamentals, 3rd Ed., © 1986, Charles E. Merrell Pub. Co., Columbus OH, pp. 600–602.
IBM Personal System/2, IBM Corp., Entry Systems Division, May 1987.
IEEE Standard Codes, Formats, Protocols, and Common Commands For Use With ANSI/IEEE Std 488.1–1987.
McCabe, R., Nov. 16, 1992, "Standards Open the Door to the New Digital Video—New Solutions Provide Easy Market Entry," Electronic Buyers' News, Issue 829.
Method for Expanding Monitor Identification Capability, IBM Technical Disclosure Bulletin, Oct. 1993.
Monitor Identification Range Extension, IBM Technical Disclosure Bulletin, Nov. 1990.
Perkins, G. W., et al., Aug. 1990, "Multimode High Definition and Personal Computer Monitor Chip Set," IEEE Trans. Consumer Elec. vol. 36, No. 3, pp. 458–466.
Richter, J., 1992, "Power Programming . . . the IBM XGA," MIS Press, New York, NY, pp. 525–527.
Rodriguez, E., "Interface for Color–Video Monitor," NASA Tech. Brief, pp. 246–247.
Sichel, P.A., Fall 1991, "ACCESS.bus, an Open Desktop Bus," Digital Technical Journal, vol. 3, No. 4.
Spiegelman, L., Oct. 1992, "Monitor Standard Impacts Software," Computer Reseller News.
Suckle, L.I., Nov. 1988, "Automatic Alignment Techniques for Color Television Manufacturing," IEEE Trans. Consumer Elec., vol. 34, No. 4, pp. 886–893.
Wischermann, G., "Method for image compression and image expansion," Manuscripts of the talks given at the Tenth Annual Meeting of the Television and Cinema Technical Association (FKTG), Sep. 13 to 17, 1982, Munich, pp. 153–167. (German with English translation).
Amano, Y., et al., 1987, "A Convergence Correction Method Without Beam Spot Size Degradation," SID 87 Digest, pp. 339–342.
Awata, Y., et al., 1986, "A New Large–Screen High–Resolution Trinitron Color Display Monitor for Computer Graphics Application," SID 86 Digest, pp. 459–462.
IEEE Standard Digital Interface For Programmable Instrumentation, ANSI/IEEE Std 488.1–1987, IEEE, 1988.

Malden, A., 1989 "Advanced Automation System Common Console Workstation Perspective," SID 89 Digest, pp. 9–14.
Small Computer System Interface (SCSI), ANSI X3.131–1986, Amer. Natl. Stds. Inst., Inc. (ANSI).
Sudo, M., et al., 1986, "High–Resolution 20V"×20V" Trinitron and Monochrome CRT", SID 86 Digest, pp. 338–341.
Suzuki, Y., et al., 1989 "Computer–Controlled Alignment for a 2000–Line Color Monitor" SID 89 Digest, pp. 196–197.
Trueblood, J. et al., 1986, "An Efficient Anti–Aliasing Software Algorithm," SID 86 Digest, pp. 348–351.
Trueblood, J., "Theory and Measurement of Anti–Aliased Line Performance", SID 87 Digest, pp. 123–126.
Uno, S., et al., "Automatic Evaluation System for CPT Picture Characteristics," Proceedings 1984 Int'l. Conference on Industrial Electronics, Control and Instrumentation (IECON) (Tokyo), vol. 1, pp. 432–437.
Vartabedian, R., et al., Aug. 5, 1988, "Hughes Asks U.S. to Revoke IBM Contract—Claims FAA Granted Rival Bidder Unfair Edge in $3.6–Billion Pact," Los Angeles Times.
Wakita, T., 1986, "A Test Signal Generator for High–Resolution CRT Displays," SID 86 Digest, 463–466.
Dasgupta, B., et al., 1986, "A Non–Destructive Method of Estimating the Harmonic Content of a Yoke," SID 86 Digest, pp. 56–59.
"Hughes Wins $325M Canada ATC Pact," Dec. 4, 1989, Electronic News, author unknown.
Hunt, V., 1986, "The Next–Generation Air Traffic Control Display," SID 86 Digest, pp. 20–22.
Nakamura, N., et al., 1988, "A 45–in Flat–and–Square Trinitron Color CRT," SID 88 Digest, pp. 386–388.
Perkins, D., "The Point–to–Point Protocol: A Proposal for Multi–Protocol Transmission of Datagrams Over Point–to Point Links," Network Working Group Request for Comments, pp. 1–38.
Sony DDM advertisement from Jane's Airport Review, Oct. 1990 (LESH001081–82).
R. McCabe, Nov. 16, 1992, "Standards open the door to the new digital video—New solutions provide easy market entry," Electronic Buyer's News, Issue No. 829, CMP Publications, Inc.
I., Spiegelman, Oct. 26, 1992, "Monitor standard impacts software," Computer Reseller news, Issue 497, CMP Publications, Inc.
P. Norton, 1986, "Inside the IBM PC," Brady Books, New York.
Philips Components PCF8581 Data Sheet, "128×8–BIT EEPROM with I$^2$C–Bus Interface," *Philips*Jun. 1989, p. 1–13.
Philips Semiconductor Application Note AN442, "Specification for a bus–controlled monitor," *Philips Semiconductor Microcontroller Products*, Dec. 1991, pp. 1–17.
"The I$^2$C–Bus and how to use if (including specifications)," *Philips Semiconductors*, Jan. 1992, 28 pages.
Ryan, Tom, "Build An Intelligent Display," *Electronic Design*, Aug. 20, 1992, 3 pages.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

New claims 5-26 are added and determined to be patentable.

*5. The display unit according to claim 1, wherein the identification number uniquely identifies the specific display unit.*

*6. The display unit according to claim 1, wherein the identification number distinguishes between display units having the same structure.*

*7. The display unit according to claim 1, wherein the display unit is capable of receiving control instructions from the video source to adjust the displayed image.*

*8. The display unit according to claim 7, wherein the display unit is capable of stopping display of an image in response to at least one control instruction from the video source.*

*9. The display unit according to claim 1, which further includes a memory storing preset values for adjusting the displayed image.*

*10. The display unit according to claim 9, wherein said preset values are for adjusting the position and contrast of the displayed image.*

*11. The display unit according to claim 1, which further includes a memory storing user adjustment data.*

*12. The display unit according to claim 1, which further includes an LCD Controller that is operably connected to a liquid crystal display panel.*

*13. The display unit according to claim 3, wherein the identification number uniquely identifies the specific display unit.*

*14. The display unit according to claim 13, wherein the display unit is capable of receiving control instructions from the video source to adjust the displayed image.*

*15. The display unit according to claim 14, which further includes a memory storing preset values for adjusting the displayed image.*

*16. The display unit according to claim 15, which further includes a memory storing user adjustment data.*

*17. The display unit according to claim 16, wherein the display unit is capable of stopping display of an image in response to at least one control instructions from the video source.*

*18. The display unit according to claim 17, wherein said preset values are for adjusting the position and contrast of the displayed image.*

*19. The display unit according to claim 18, which further includes an LCD Controller that is operably connected to a liquid crystal display panel.*

*20. The display unit according to claim 3, wherein the identification number distinguishes between display units having the same structure.*

*21. The display unit according to claim 3, wherein the display unit is capable of receiving control instructions from the video source to adjust the displayed image.*

*22. The display unit according to claim 21, wherein the display unit is capable of stopping display of an image in response to at least one control instruction from the video source.*

*23. The display unit according to claim 3, which further includes a memory storing preset values for adjusting the displayed image.*

*24. The display unit according to claim 23, wherein said preset values are for adjusting the position and contrast of the displayed image.*

*25. The display unit according to claim 3, which further includes a memory storing user adjustment data.*

*26. The display unit according to claim 3, which further includes an LCD Controller that is operably connected to a liquid crystal display panel.*

\* \* \* \* \*

(12) EX PARTE REEXAMINATION CERTIFICATE (9764th)
United States Patent
Arai et al.

(10) Number: US 6,247,090 C2
(45) Certificate Issued: Jul. 22, 2013

(54) DISPLAY APPARATUS ENABLED TO CONTROL COMMUNICATABILITY WITH AN EXTERNAL COMPUTER USING IDENTIFICATION INFORMATION

(75) Inventors: Ikuya Arai, Yokohama (JP); Kouji Kitou, Yokohama (JP)

(73) Assignee: Mondis Technology Ltd., Hampstead, London (GB)

Reexamination Request:
No. 90/012,494, Sep. 11, 2012

Reexamination Certificate for:
Patent No.: 6,247,090
Issued: Jun. 12, 2001
Appl. No.: 09/265,363
Filed: Mar. 10, 1999

Reexamination Certificate C1 6,247,090 issued Jul. 20, 2010

Certificate of Correction issued Nov. 2, 2010
Certificate of Correction issued Dec. 28, 2010

Related U.S. Application Data

(63) Continuation of application No. 08/833,346, filed on Apr. 4, 1997, now Pat. No. 5,887,147, which is a continuation of application No. 08/598,903, filed on Feb. 9, 1996, now Pat. No. 5,652,845, which is a continuation of application No. 08/190,848, filed on Feb. 3, 1994, now abandoned.

(30) Foreign Application Priority Data

Feb. 10, 1993 (JP) .................................. 5-022212

(51) Int. Cl.
*G09G 1/16* (2006.01)
*G06F 3/153* (2006.01)
*G06F 3/14* (2006.01)

(52) U.S. Cl.
USPC ....... 710/9; 345/99; 710/62; 710/64; 725/105

(58) Field of Classification Search
None
See application file for complete search history.

(56) References Cited

To view the complete listing of prior art documents cited during the proceeding for Reexamination Control Number 90/012,494, please refer to the USPTO's public Patent Application Information Retrieval (PAIR) system under the Display References tab.

*Primary Examiner* — Minh Dieu Nguyen

(57) ABSTRACT

In the computer, the control information for screen display incorporated in the keyboard and software is processed by CPU2 and sent to the display device via the communication controller. The microcomputer in the display device fetches the control information from the communication controller and controls a predetermined part of the video circuit or deflection circuit. In this case, identification information is sent to the display device from the computer first and when it matches with the identification information stored in the memory, the above control is permitted.

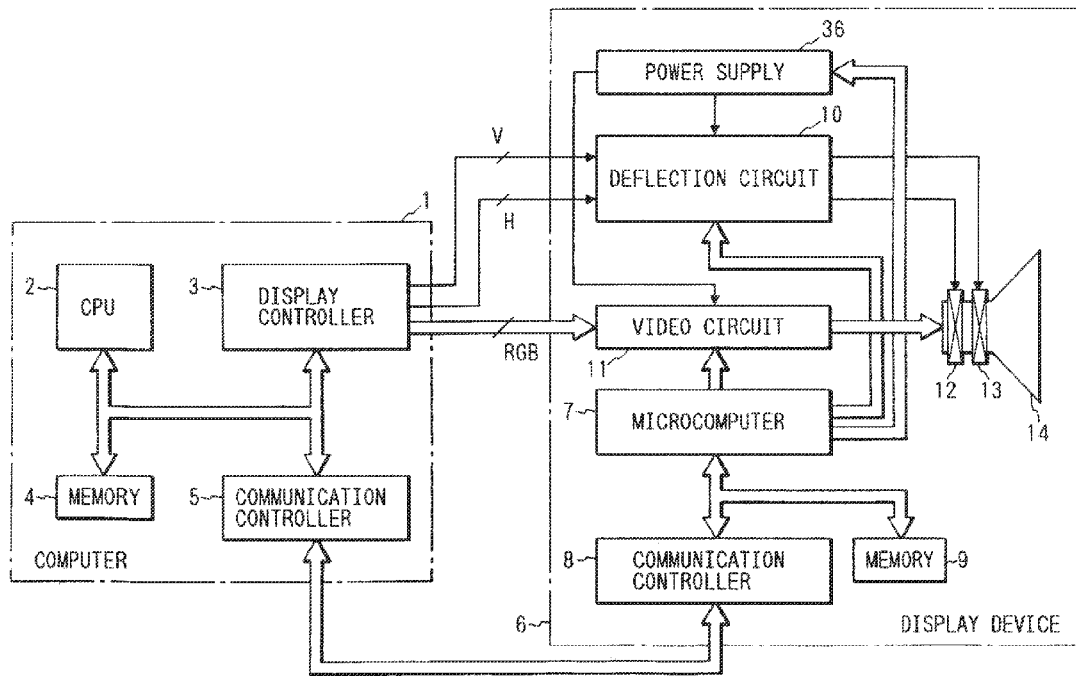

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-2, 4-19 and 21-26 is confirmed.

Claims 3 and 20 are cancelled.

\* \* \* \* \*